US010751254B2

(12) United States Patent
Joplin et al.

(10) Patent No.: US 10,751,254 B2
(45) Date of Patent: Aug. 25, 2020

(54) METHODS AND SYSTEMS FOR LABELING AND LOADING PHARMACEUTICAL CONTAINERS

(71) Applicant: EXPRESS SCRIPTS STRATEGIC DEVELOPMENT, INC., St. Louis, MO (US)

(72) Inventors: Jonathan W. Joplin, Chesterfield, MO (US); Robert Hoffman, Linden, IN (US)

(73) Assignee: Express Scripts Strategic Development, Inc., St. Louis, MO (US)

(*) Notice: Subject to any disclaimer, the term of this patent is extended or adjusted under 35 U.S.C. 154(b) by 0 days.

(21) Appl. No.: 15/946,431

(22) Filed: Apr. 5, 2018

(65) Prior Publication Data
US 2018/0221244 A1   Aug. 9, 2018

Related U.S. Application Data

(63) Continuation of application No. 14/918,246, filed on Oct. 20, 2015, now Pat. No. 9,937,100.

(51) Int. Cl.
*A61J 3/00* (2006.01)
*B65C 3/08* (2006.01)
*G06Q 10/08* (2012.01)
*B65B 5/10* (2006.01)
*B65B 61/20* (2006.01)
*B65C 3/14* (2006.01)

(52) U.S. Cl.
CPC ............... *A61J 3/00* (2013.01); *B65B 5/105* (2013.01); *B65B 61/20* (2013.01); *B65C 3/08* (2013.01); *G06Q 10/08* (2013.01); *B65C 3/14* (2013.01)

(58) Field of Classification Search
CPC combination set(s) only.
See application file for complete search history.

(56) References Cited

U.S. PATENT DOCUMENTS

| 3,703,232 | A  | 11/1972 | Zbiegien |
| 5,771,657 | A  | 6/1998  | Lasher et al. |
| 6,769,228 | B1 | 8/2004  | Mahar |
| 6,892,512 | B2 | 5/2005  | Rice et al. |
| 7,313,898 | B1 | 1/2008  | Eller et al. |
| 7,409,977 | B2 | 8/2008  | Rice et al. |
| 7,765,776 | B1 | 8/2010  | Leu et al. |
| 7,837,093 | B1 | 11/2010 | Leu et al. |
| 7,995,831 | B2 | 8/2011  | Eller et al. |

(Continued)

*Primary Examiner* — Kyle O Logan
(74) *Attorney, Agent, or Firm* — Tucker Arensberg, P.C.

(57) ABSTRACT

A pharmaceutical order filling system receives pharmaceutical orders and uses a loading device to label containers and load the labeled containers onto a pallet. The loading device is configured with at least one container drop assembly that receives containers to be labelled and loaded onto the pallet and that is in communication with a label assembly configured to print and apply labels to the containers. The loading device also includes at least one loading rotary wheel configured to receive the labelled containers and hold the labelled containers in a pick position to be moved from the pick position to a predetermined position on the pallet. The loading device may be configured to accommodate multiple sizes of containers and to consolidate multiple sizes of labelled containers into a single loading rotary wheel for loading onto the pallet.

29 Claims, 15 Drawing Sheets

(56) References Cited

U.S. PATENT DOCUMENTS

| | | |
|---|---|---|
| 8,731,711 B1 | 5/2014 | Joplin et al. |
| 8,786,650 B1 | 7/2014 | Eller et al. |
| 9,937,100 B1 | 4/2018 | Joplin et al. |
| 2013/0260448 A1 | 10/2013 | Wilson et al. |
| 2014/0202935 A1* | 7/2014 | Joplin .................. B21B 41/00 209/523 |
| 2015/0151923 A1* | 6/2015 | Dent .................. G06Q 50/24 700/226 |

* cited by examiner

METHODS AND SYSTEMS FOR LABELING AND LOADING PHARMACEUTICAL CONTAINERS

FIELD

The present application relates generally to the technical field of automated filling centers. In a specific example, the present application may relate to a high volume fulfillment center, e.g., a high volume pharmacy and to systems and devices used in filling prescriptions and prescription orders at a high volume pharmacy.

BACKGROUND

A high-volume pharmacy may process and fill a large number of prescriptions and prescription orders. Automated systems may be used by a high volume pharmacy to process and fulfill prescriptions.

Frequently, more than one prescription drug is required to complete a prescription order. Portions of the prescription order may be fulfilled in different areas of the high-volume pharmacy. After fulfillment, the fulfilled prescriptions may be gathered into a complete prescription order for shipping.

DETAILED DESCRIPTION

Example systems and methods for labeling and loading containers onto a pallet are described. In the following description, for purposes of explanation, numerous specific details are set forth in order to provide a thorough understanding of example embodiments. It will be evident, however, to one of ordinary skill in the art that embodiments may be practiced without these specific details.

Generally, a prescription order is generated for a high volume pharmacy. The prescription order may include more than one prescription drug for fulfillment. Each prescription drug in a prescription order is an order component of the prescription order. Generally, the order components are pill containers or containers and packaging having a quantity of a prescription drug contained therein.

These containers may be transported throughout various areas within a pharmacy by use of pallets containing a number of cavities. Pucks may be placed in these cavities of the pallet that are differently sized and shaped receptacles to accommodate containers of differing sizes. The arrangement of pucks in a pallet may be determined based on prescriptions or prescription orders.

Figure 1:
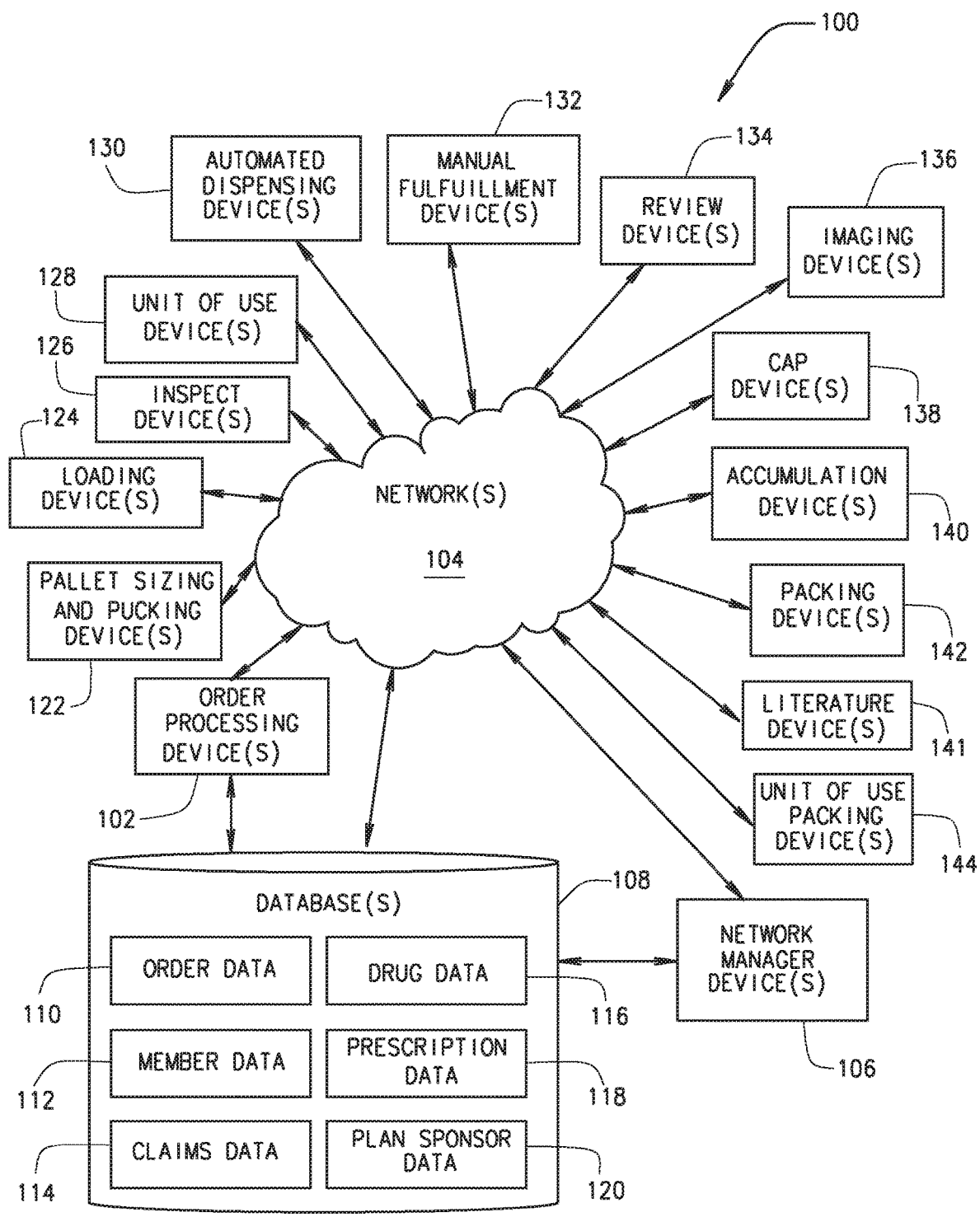
FIG. 1 is a block diagram of an example system, according to an example embodiment.

FIG. 1 is a block diagram of an example system 100, according to an example embodiment. While the system 100 is generally described as being deployed in a high volume pharmacy (e.g., a mail order pharmacy, a direct delivery pharmacy, an automated pharmacy, and the like), the system 100 may otherwise be deployed. The system 100 may include an order processing device 102 in communication with a benefit manager device 106 over a network 104. Additional devices which may be in communication with the benefit manager device 106 and/or the order processing device 102 over network 104 include: database(s) 108 which may store one or more than one of order data 110, member data 112, claims data 114, drug data 116, prescription data 118, and plan sponsor data 120; pallet sizing and pucking device(s) 122; loading device(s) 124; inspect device(s) 126; unit of use device(s) 128; automated dispensing device(s) 130; manual fulfillment device(s) 132; review device(s) 134; imaging device(s) 136; cap device(s) 138; accumulation device(s) 140; literature device(s) 141; packing device(s) 142; and unit of use packing device(s) 144. The system 100 may also include additional devices, which may communicate with each other over network 104 or directly.

The order processing device 102 may receive information about prescriptions being filled at a pharmacy in which the order processing device 102 is deployed. In general, the order processing device 102 is a device located within or otherwise associated with a pharmacy location to enable fulfillment of a prescription by dispensing prescription drugs. In some embodiments, the order processing device 102 may be a device separate from a pharmacy that enables communication with other devices located within a pharmacy. For example, the order processing device 102 may be in communication with another order processing device 102 and/or other devices 122-144 located with a pharmacy. In some embodiments, an external pharmacy order processing device 102 may have limited functionality (e.g., as operated by a patient requesting fulfillment of a prescription drug) when an internal pharmacy order processing device 102 may have greater functionality (e.g., as operated by a pharmacy).

The order processing device 102 may track a prescription order as it is fulfilled. A prescription order may include one or more than one prescription to be filled by the pharmacy. The order processing device 102 may make pharmacy routing decisions and/or order consolidation decisions for a prescription order. The pharmacy routing decisions include what device or devices in the pharmacy are responsible for filling at least a portion of the prescription order, where the order consolidation decisions include whether portions of a prescription order or multiple prescription orders should be shipped together for a patient or a patient family. The order processing device 102 may operate on its own or in combination with the benefit manager device 106. The order processing device 102 may track and/or schedule the literature or other paperwork associated with each order or multiple prescription orders that are being shipped together.

Examples of the devices 102, 106 include a set-top box (STB), a receiver card, a mobile telephone, a personal digital assistant (PDA), a display device, a portable gaming unit, a tablet, a portable computing, and a computing system; however other devices may also be used. For example order processing device 102 may include a mobile electronic device, such an IPHONE or IPAD device by Apple, Inc. mobile electronic devices powered by ANDROID by Google, Inc. and a BLACKBERRY device by Blackberry Limited. The devices 102, 106 may also include other computing devices, such as desktop computing devices, notebook computing devices, netbook computing devices, gaming devices, servers, and the like. The devices 102, 106 may include circuitry, a processor, a memory to store data and instructions, and communication functionality. Other types of electronic devices that can use rules and instructions to execute various functions may also be used.

Examples of the network 104 include Mobile Communications (GSM) network, a code division multiple access (CDMA) network, $3^{rd}$ Generation Partnership Project (3GPP), an Internet Protocol (IP) network, a Wireless Application Protocol (WAP) network, a WiFi network, or an IEEE 802.11 standards network, as well as various combinations thereof. The network 104 may include optical communications. The network 104 may be a local area network or a global communication network, such as the Internet. Other conventional and/or later developed wired and wireless networks may also be used. In some embodiments, the network 104 may include a prescribing network such as the electronic prescribing network operated by Surescripts of Arlington, Va.

The benefit manager device 106 is a device operated by an entity at least partially responsible for creation and/or management of the pharmacy or drug benefit. While this benefit manager operating the benefit manager device 106 is typically a pharmacy benefit manager (PBM), other entities may operate the benefit manager device 106 either on behalf of themselves, the PBM, or another entity. For example, the benefit manager may be operated by a health plan, a retail pharmacy chain, a drug wholesaler, a data analytics or other type of software-related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy. The pharmacies may be retail pharmacies, mail order pharmacies, or otherwise.

Some of the operations of the PBM that operates the benefit manager device 106 may include the following. A member (or a person on behalf of the member) of a pharmacy benefit plan administered by or through the PBM attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of a machine, such as a kiosk, vending unit, mobile electronic device, or a different type of mechanical, electrical, electronic communication device, and/or computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of a plan sponsor or client with the PBM. The member's co-pay may be based on a flat co-pay (e.g., $10), co-insurance (e.g., 10%), and/or a deductible (e.g., for first $500 of annual prescription drug spend) for certain prescription drugs, certain types and/or classes of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug. The co-pay may also vary based on the delivery channel used to receive the prescription drug. For example, the co-pay for receiving prescription drug from a mail order pharmacy location may be less than the co-pay for receiving prescription drug from a retail pharmacy location.

In conjunction with receiving the co-pay (if any) from the member and dispensing the prescription drug to the member, the pharmacy submits a claim to the PBM for the prescription drug. The PBM may perform certain adjudication operations including verifying the eligibility of the member, reviewing an applicable formulary of the member to determine appropriate co-pay, coinsurance, and deductible for the prescription drug, and performing a drug utilization review (DUR) on the member. The PBM then provides a response to the pharmacy following performance of at least some of the aforementioned operations. As part of the adjudication, the plan sponsor (or the PBM on behalf of the plan sponsor) ultimately reimburses the pharmacy for filling the prescription drug when the prescription drug was successfully adjudicated. The aforementioned adjudication operations generally occur before the co-pay is received and the prescription drug dispensed. However, the operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be based at least in part on the type of pharmacy network in which the pharmacy is included. Other factors may be used to determine the amount in addition to the type of pharmacy network. For example, if the member pays the pharmacy for the prescription without using the prescription drug benefit provided by the benefit manager, the amount of money paid by the member may be higher and the amount of money received by the pharmacy for dispensing the prescription drug and for the prescription drug itself may be higher. Some or all of the foregoing operations may be performed by executing instructions on the benefit manager device 106 and/or an additional device.

In some embodiments, at least some of the functionality of the order processing device 102 may be included in the benefit manager device 106. The order processing device 102 may be in a client-server relationship with the benefit manager device 106, a peer-to-peer relationship with the benefit manager device 106, or in a different type of relationship with the benefit manager device 106.

The order processing device 102 and/or the benefit manager device 106 may be in communication directly (e.g., through local storage or peer-to-peer connection(s)) and/or through the network 104 (e.g., in a cloud configuration or software-as-a-service) with a database 108 (e.g., as may be retained in memory or otherwise). The database 108 may be deployed on the order processing device 102, the benefit manager device 106, on another device of the system 100, or otherwise. The database 108 may store order data 110, member data 112, claims data 114, drug data 116, prescription data 118, and/or plan sponsor data 120. Other data may be stored in the database 108.

The order data 110 may include data related to the order of prescriptions including the type (e.g., drug name and strength) and quantity of each prescription in a prescription order. The order data 110 may also include data used for completion of the prescription, such as prescription materials and/or the type and/or size of container in which the drug is or is preferably dispensed. In general, prescription materials are a type of order materials that include a tangible electronic copy of information regarding the prescription drug for inclusion with or otherwise in conjunction with the fulfilled prescription. The prescription materials may include tangible electronic information regarding drug interaction warnings, recommended usage, possible side effects, expiration date, date of prescribing, or the like. The electronic information may be stored in a memory, operated on by a processor or otherwise be in a machine readable form. The order data 110 may be used by a high volume fulfillment center to fulfill a pharmacy order.

In some embodiments, the order data 110 includes verification information associated with fulfillment of the prescription in the pharmacy. For example, the order data 110 may include videos and/or images taken of (i) the prescription drug prior to dispensing, during dispensing, and/or after dispensing, (ii) the prescription container (e.g., a prescription bottle and sealing lid) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other type of verification information such as bar code data read from pallets used to transport prescriptions within the pharmacy may also be stored as order data 110.

The member data 112 includes information regarding the members associated with the benefit manager. The information stored as member data 112 may include personal information, personal health information, protected health information, and the like. Examples of the member data 112 include name, address, telephone number, e-mail address, prescription drug history, and the like. The member data 112 may include a plan sponsor identifier that identifies the plan sponsor associated with the member and/or a member identifier that identifies the member to the plan sponsor. The member data 112 may include a member identifier that identifies the plan sponsor associated with the patient and/or a patient identifier that identifies the patient to the plan sponsor. The member data 112 may also include, by way of example, dispensation preferences such as type of label, type of cap, message preferences, language preferences, or the like.

The member data 112 may be accessed by various devices in the pharmacy, e.g., the high volume fulfillment center, to obtain information utilized for fulfillment and shipping of prescription orders. In some embodiments, an external order processing device 102 operated by or on behalf of a member may have access to at least a portion of the member data 112 for review, verification, or other purposes.

In some embodiments, the member data 112 may include information for persons who are patients of the pharmacy but are not members in a benefit plan being provided by the benefit manager. For example, these patients may obtain drug directly from the pharmacy, through a private label service offered by the pharmacy, the high volume fulfillment center, or otherwise. In general, the use of the terms member and patient may be used interchangeably herein.

The claims data 114 includes information regarding pharmacy claims adjudicated by the PBM under a drug benefit program provided by the PBM for one, or more than one, plan sponsors. In general, the claims data 114 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility. Additional information may be included.

In some embodiments, other types of claims beyond prescription drug may be stored in the claims data 114. For example, medical claims, dental claims, wellness claims, or other type of health care-related claims for members may be stored as a portion of the claims data 114.

In some embodiments, the claims data 114 includes claims that identify the members with whom the claims are associated. In some embodiments, the claims data 114 includes claims that have been de-identified (e.g., associated with a unique identifier but not with a particular, identifiable member).

The drug data 116 may include drug name (e.g., technical name and/or common name), other names by which the drug is known by, active ingredients, an image of the drug (e.g., in pill form), and the like. The drug data 116 may include information associated with a single medication or multiple medications.

The prescription data 118 may include information regarding prescriptions that may be issued by prescribers on behalf of patients, who may be members of the drug benefit plan, for example to be filled by a pharmacy. Examples of the prescription data 118 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 110 may be linked to associated member data 112, claims data 114, drug data 116, and/or prescription data 118.

The plan sponsor data 120 includes information regarding the plan sponsors of the benefit manager. Examples of the plan sponsor data 120 include company name, company address, contact name, contact telephone number, contact e-mail address, and the like.

The order processing device 102 may direct at least some of the operations of the devices 122-144, recited above. In some embodiments, operations performed by one of these devices 122-144 may be performed sequentially, or in parallel with the operations of another device as may be coordinated by the order processing device 102. In some embodiments, the order processing device 102 tracks a prescription with the pharmacy based on operations performed by one or more of the devices 122-144.

In some embodiments, the system 100 may transport prescription drug containers (e.g., between one or more than one of the devices 122-144 in the high volume fulfillment center) by use of pallets. The pallet sizing and pucking device 122 may configure pucks in a pallet. A pallet may be a transport structure for a number of prescription containers, and may include a number of cavities. A puck may be placed in one or more than one of the cavities in a pallet by the pallet sizing and pucking device 122. A puck may include a receptacle sized and shaped to receive a prescription container. Such containers may be supported by the pucks during carriage in the pallet and during movement through the fulfillment process. Different pucks may have differently sized and shaped receptacles to accommodate containers of differing sizes, as may be appropriate for different prescriptions. Pucks allow the standardization of equipment engaging differently sized drug containers such that some automated equipment can move the drug container by gripping the puck that is supporting the container and allow the use of a standardized pallet that holds a plurality of pucks have a same outer dimension while having differently sized receptacles therein to hold differently sized drug containers. The pucks may also operate to ensure that a drug container is centered in a location on the pallet.

The arrangement of pucks in a pallet may be determined by the order processing device 102 based on prescriptions which the order processing device 102 decides to launch. In general, prescription orders in the order database 110 reside in one or more than one queues, and are generally launched in a first-in-first-out order. However, the order processing device 102 may use logic and a variety of factors to determine when and how prescriptions are to be launched. For example, some non-limiting factors which may alter the first-in-first-out order of launching prescriptions in a pharmacy include the age of the order, whether the order required an outreach to a physician or some other intervention, whether there are any performance guarantees with plan sponsors or members, the available inventory of a given pharmaceutical in view of existing prescriptions already launched which will require that pharmaceutical, the zip code to which the order will be shipped, the workload and volume of various parts of the pharmacy, whether valid paperwork for the order has been received, and/or similar orders for the same pharmaceutical that are already to be launched. The logic may be implemented directly in the pallet sizing and pucking device 122, in the order processing device 102, in both devices 102, 122, or otherwise. Once a prescription is set to be launched, a puck suitable for the appropriate size of container for that prescription may be positioned in a pallet by a robotic arm or pickers. The pallet sizing and pucking device 122 may launch a pallet once pucks have been configured in the pallet.

The loading device 124 may load prescription containers into the pucks on a pallet by a robotic arm, a pick and place mechanism, or the like. In one embodiment, the loading device 108 has robotic arms or pickers to grasp a prescription container and move it to and from a pallet. The loading device 124 may also print a label which is appropriate for a container that is to be loaded onto the pallet, and apply the label to the container. The pallet may be located on a conveyor assembly during these operations. In an example embodiment, the drug containers may be positioned in the pucks by the loading device 124 prior to the pucks being placed in the pallet.

The inspect device 126 may verify that containers in a pallet are correctly labeled and in the correct spot on the pallet. The inspect device 126 may scan the label on one or more than one container on the pallet. Labels of containers may be scanned or imaged in full or in part by the inspect device 126. Such imaging may occur after the container has been lifted out of its puck by a robotic arm, picker, or the like, or may be otherwise scanned or imaged while retained in the puck. In some embodiments, images and/or video captured by the inspect device 126 may be stored in the database 108 as order data 110.

The unit of use device 128 may temporarily store, monitor, label and/or dispense unit of use products. In general, unit of use products are prescription drug products that may be delivered to a patient or member without being repackaged at the pharmacy. These products may include pills in a container, pills in a blister pack, inhalers, and the like. Prescription drug products dispensed by the unit of use device 128 may be packaged individually or collectively for shipping, or may be shipped in combination with other prescription drugs dispensed by other devices in the high volume fulfillment center. Unit of use packaged orders may be combined with other containers for shipment. Such unit of use packages can take the place of a container in a shipment package or placed beneath containers in the shipment package, e.g., before the containers are placed in the package.

The automated dispensing device 130 may include one or more than one devices that dispense prescription drugs or pharmaceuticals into prescription containers in accordance with one or multiple prescription orders. In general, the automated dispensing device 130 may include mechanical and electronic components with, in some embodiments, software and/or logic to facilitate pharmaceutical dispensing that would otherwise be performed in a manual fashion by a pharmacist and/or pharmacist technician. For example, the automated dispensing device 130 may include high volume fillers that fill a number of prescription drug types at a rapid rate and blister pack machines that dispense and pack drugs into a blister pack. Prescription drugs dispensed by the automated dispensing devices 130 may be packaged individually or collectively for shipping, or may be shipped in combination with other prescription drugs dispenses by other devices in the high volume fulfillment center.

The manual fulfillment device 132 may provide for manual fulfillment of prescriptions. For example, the manual fulfillment device 132 may receive or obtain a container and enable fulfillment of the container by a pharmacist or pharmacy technician. In some embodiments, the manual fulfillment device 132 provides the filled container to another device in the system 100. In an example embodiment, the container may be joined with other containers in a prescription order for a patient or member, e.g., on a pallet or at the accumulation device 140. In general, a manual fulfillment may include operations at least partially performed by a pharmacist or pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter). Prescription drugs dispensed by the manual fulfillment device 132 may be packaged individually or collectively for shipping, or may be shipped in combination with other prescription drugs dispenses by other devices in the high volume fulfillment center.

The review device 134 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 134 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review can be performed at the manual station. The review of a filled prescription container may be performed before the container is capped and sealed, as well as before the container is packaged for shipment.

The imaging device 136 may image containers once they have been filled with pharmaceuticals. The imaging device 136 may measure the fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 102, and/or stored in the database 110 as part of the order data 110.

The cap device 138 may be used to cap or otherwise seal a prescription container. In some embodiments, the cap device 138 may secure a prescription container with a type of cap in accordance with a patient preference (e.g., a preference regarding child resistance), a plan sponsor preference, a prescriber preference, or the like. The cap device 138 may also etch a message into the cap or otherwise associate a message into the cap, although this process may be performed by a subsequent device in the high volume fulfillment center.

The accumulation device 140 accumulates various containers of prescription drugs in a prescription order. The accumulation device 140 may accumulate prescription containers from various devices or areas of the pharmacy. For example, the accumulation device 140 may accumulate prescription containers from the unit of use device 128, the automated dispensing device 130, the manual fulfillment device 132, and the review device 134, at the high volume fulfillment center. The accumulation device 140 may be used to group the prescription containers prior to shipment to the member or otherwise.

In some embodiments, the literature device 141 folds or otherwise prepares the literature for inclusion with a prescription drug order (e.g., in a shipping container). In some embodiments, the literature device 141 that prints the literature may be separate from the literature device that prepares the literature for inclusion with a prescription order.

The packing device 142 packages a prescription order in preparation for shipping the order. The packing device 142 may box, bag, or otherwise package the fulfilled prescription order for delivery. The packing device 142 may further place inserts, e.g., literature or other papers, into the packaging received from the literature device 141 or otherwise. For example, bulk prescription orders may be shipped in a box, while other prescription orders may be shipped in a bag which may be a wrap seal bag. The packing device 142 may label the box or bag with the address and a recipient's name. The label may be printed and affixed to the bag or box, be printed directly onto the bag or box, or otherwise associated with the bag or box. The packing device 142 may sort the box or bag for mailing in an efficient manner (e.g., sort by delivery address). The packing device 142 may include ice or temperature sensitive elements for prescriptions which are to be kept within a temperature range during shipping in order to retain efficacy or otherwise. The ultimate package may then be shipped through postal mail, through a mail order delivery service that ships via group and/or air (e.g., UPS, FEDEX, or DHL), through delivery service, through a local delivery service (e.g., a courier service), through a locker box at a shipping site (e.g., an AMAZON locker or a post office box), or otherwise.

The unit of use packing device 144 packages a unit of use prescription order in preparation for shipping the order. The unit of use packing device 144 may include manual scanning of containers to be bagged for shipping to verify each container in the order. In an example embodiment, the manual scanning may be performed at a manual station.

While the system 100 in FIG. 1 is shown to include single devices 102, 106, 122-144 multiple devices may be used. The devices 102, 106, 122-144 may be the same type or model of device or may be different device types or models. When multiple devices are present, the multiple devices may be of the same device type or models or may be a different device type or model. The types of devices 102, 106, 122-144 shown in FIG. 1 are example devices. In other configurations of the system 100, lesser, additional, or different types of devices may be included. Moreover, the system 100 shows a single network 104; however, multiple networks can be used. The multiple networks may communicate in series with each other to link the devices 102, 106, 122-144 or in parallel to link the devices 102, 106, 122-144. Multiple devices may share processing and/or memory resources. The devices 102, 106, 122-144 may be located in the same area or in different locations. For example, the devices 102, 106, 122-144 may be located in a building or set of adjoining buildings. The devices 102, 106, 122-144 may be interconnected (e.g., by conveyors), networked, and/or otherwise in contact with one another or integrated with one another, e.g., at the high volume fulfillment center. In addition, the functionality of a device may be split among a number of discrete devices and/or combined with other devices.

The system 100 may include a single database, or multiple databases, maintained by respective devices operated by or on behalf one or a number of different persons and/or organizations. The communication may occur directly (e.g., through local storage) and/or through the network 104 (e.g., in a cloud configuration or software-as-a-service) with a device that stores a respective database. FIG. 1 represents an example deployment of the database 108. However, the system 100 is not limited to this configuration. The database 108 may be deployed separately from and/or one or more than one of the devices 102, 106, 122-144, partially on more than one of the devices 102, 106, 122-144, or may otherwise be deployed. The deployment may occur on local storage, remote storage, removable storage, and/or a different type of storage associated with the devices 102, 106, 122-144. Additionally, while a single database is generally depicted, multiple databases may be implemented. In the case of multiple databases, the different databases may be deployed on different systems, including the devices 102, 106, 122-144 and/or a third-party device or network.

Figure 2:
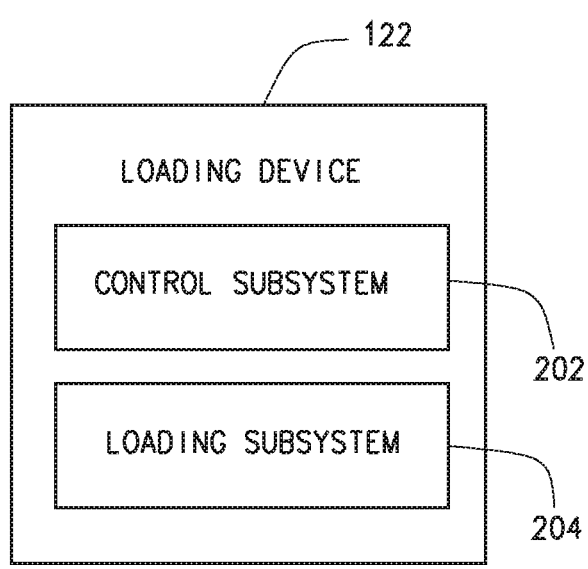
FIG. 2 is a block diagram of an example loading device that may be deployed within the system of FIG. 1, according to an example embodiment.

FIG. 2 illustrates a loading device 124, according to an example embodiment. The loading device 124 may be deployed in the system 100 of FIG. 1, or may otherwise be used. The loading device 124 may include a control subsystem 202 and a loading subsystem 204. The control subsystem 202 enables the loading device 124 to control the loading subsystem 204, while the loading subsystem 204 may include one or more than one devices to enable the loading device 124 to perform loading and labeling operations (e.g., labeling containers and loading containers onto a pallet).

An example deployment of the loading device 124 is within the system 100. In such a deployment, the system 100 includes one or more than one conveyor or other devices to facilitate transporting containers or pallets of containers through mechanical devices within the system 100, such as devices to fill, cap, and check containers. The loading device 124 may be otherwise deployed.

Figure 3:
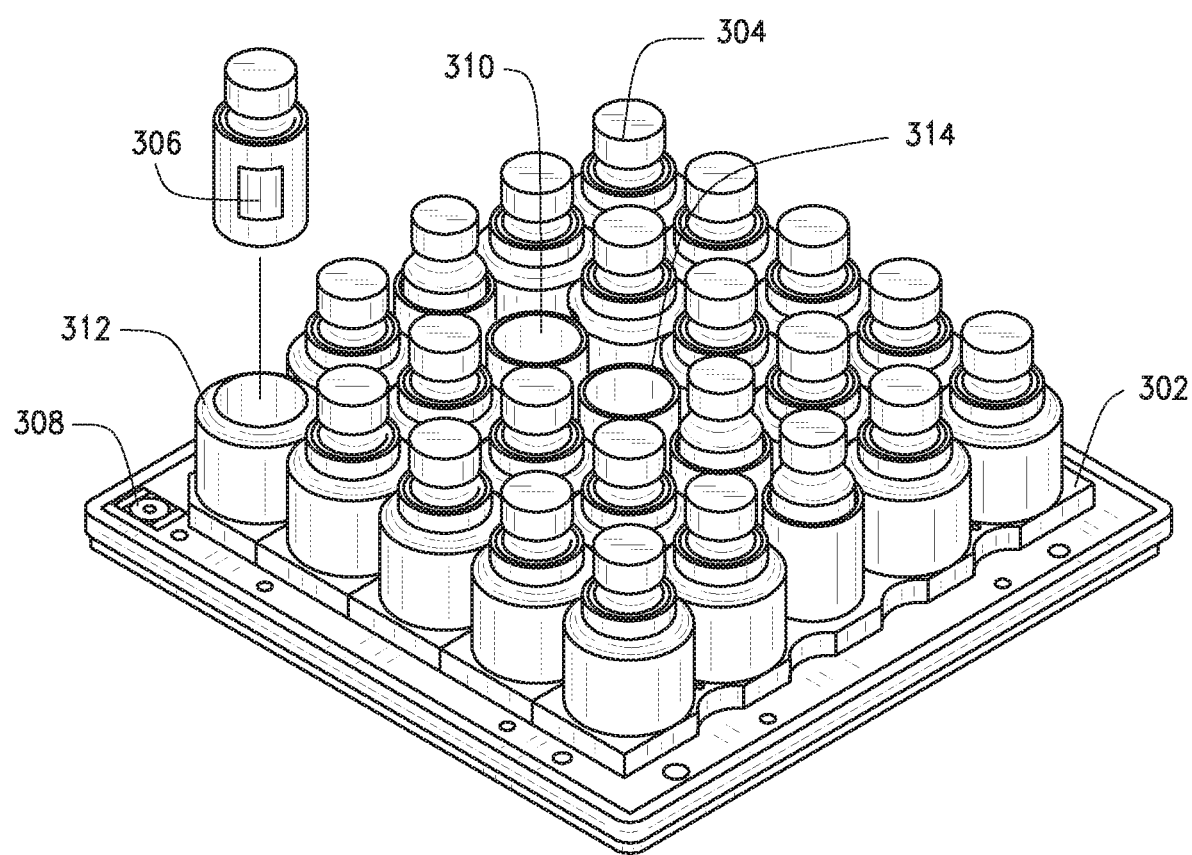
FIG. 3 is a top, perspective view of a pallet that may be deployed within the system of FIG. 1, according to an example embodiment.

FIG. 3 illustrates a pallet 302, according to an example embodiment. The pallet 302 may be used in the system 100 of FIG. 1 (e.g., by the loading device 124), or may be otherwise used.

The pallet 302 may be a transport structure for a number of prescription containers 304, and may include a number of cavities 310. While the pallet 302 is shown to include 25 cavities in a five by five cavity row/column configuration, other numbers of categories and/or cavity configurations of varying shapes, size, and/or dimensions may be used. In some embodiments the pallet 302 may be substantially square and, in such an embodiment, have a width and length of between approximately 18 inches and 22 inches (e.g., approximately 18 inches, 19 inches, 20 inches, 21 inches, or 22 inches). In some embodiments, the width and/or length may be greater than approximately 22 inches or less than approximately 18 inches.

In an example embodiment, the cavities 310 may be spaced on the pallet 302 such that the center point of adjacent cavities 310 is between approximately 3 inches and 4 inches (e.g., approximately 3 inches, 3.25 inches, 3.5 inches, 3.75 inches or 4 inches). In another embodiment, the distance between center points of adjacent cavities 310 is more than approximately 4 inches. In yet another embodiment, the center points of cavities 310 are less than approximately 3 inches apart.

The pallet 302 may be made in whole or in part of metal, such as aluminum. Other suitable materials may be used for the pallet 302, such as plastic. The pallet 302 may be rigid so that the cavities remain in a known location that can be tracked while the pallet moves through the system 100. The pallet 302 may include bumpers.

In some embodiments, other carriers beyond the pallet 302 and/or no carrier may be used to move containers or groups of containers through the system 100 or devices within the system 100.

The pallet 302 may retain one or more than one containers 304. A container 304 is generally cylindrical with an open interior and may be of one or a variety of sizes utilized by a pharmacy for fulfillment of a prescription. For example, a pharmacy may have two different sized containers or three different sized containers. Any number of different sized containers may be used with the pallet 302. While the container 304 is generally denoted as being used with the pallet 302, the containers 304 may otherwise be used in the system 100 or in a different system. Shapes beyond cylindrical shapes may be used for the containers 304. Examples of other shapes include regular prisms, elliptical cylinders, and combinations thereof. The receptacle of a puck 312 may be sized to receive and support the outer shape of the container 310. The containers 304 may be disposed in the pallet 302 such that they are close to one another but do not touch.

The containers 304 may include labels 306. A label 306 may be uniquely printed for each container 304 (e.g., to include information such as a patient name, drug name, dosage, directions for use, and/or other information required and/or desirable for a prescription label). The labels 306, or some portion of the information for the labels 306, may be the same for a particular set of the labels 306, such as the dispensing pharmacy.

The pallet 302 may include a radio-frequency identification (RFID) tag 308. The RFID tag 308 may be an active RFID tag, such as an active RFID tag with a close reading range. In some embodiments, the RFID tag 308 is an active, narrowband, read/write RFID tag.

The RFID tag 308 of a particular pallet 302 may store data (or otherwise facilitate the access of data, e.g., from the database 108) associated with the containers 304 that have been, are, and/or will be placed within the pallet 302, such as the order data 110, the member data 112, the claims data 114, the drug data 116, the prescription data 118, and/or the plan sponsor data 120 associated with such containers 304. Other data may be stored by and/or or associated with the RFID tag 314, such as the age of the pallet 302, the number of times the pallet 302 has been used to transport containers 304 through the system 100, the number of errors associated with the pallet 302, and the like. The RFID tag 314 may also store the position of individual containers on the pallet 302. In an example embodiment, the RFID tag 308 of the pallet 302, while deployed within the loading subsystem 204, stores data associated with one or more of the following data fields: (1) container identifiers (e.g., the location of the container identifier on the RFID tag 308 represents the cavity 310 into which the container 304 associated with the container identifier will be placed), (2) the group status (e.g., the status of a group or set of containers), (3) a loading system identifier, e.g., an identifier that associates the pallet 302 with the particular loading subsystem 204 at which the pallet was loaded with containers, and (4) a route identifier, e.g., an identifier that associates the pallet 302 with a particular route through the system 100 including, for example, a particular automated dispensing device 130 to which the pallet 302 will be routed.

The pucks 312 may be used to modify the size of the cavities 310 to allow the pallet 302 to accommodate different sizes of the containers 304.

Figure 4:
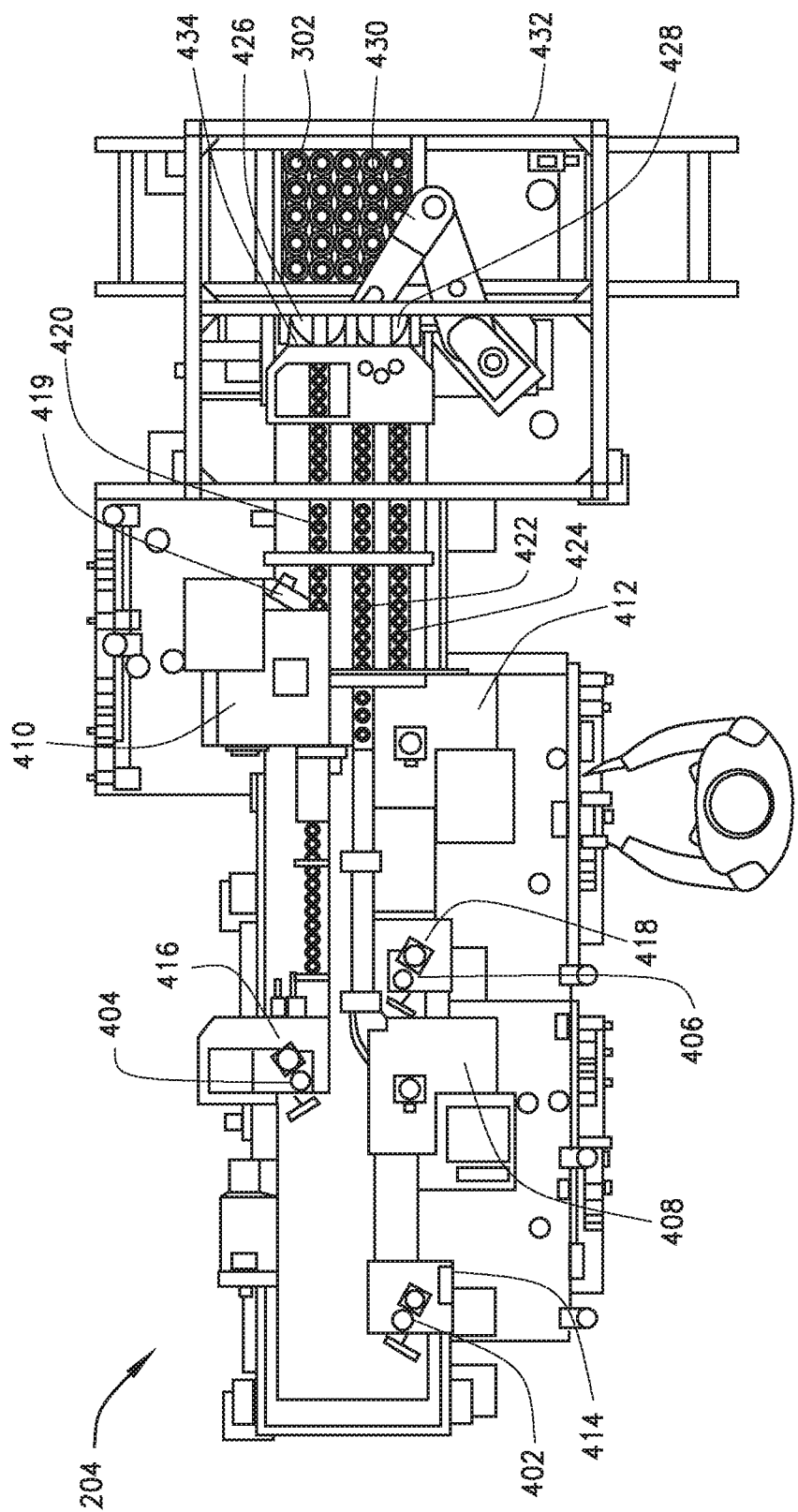
FIG. 4 is a top view of loading subsystem that may be deployed within the loading device of FIG. 2, according to an example embodiment.
Figure 5:
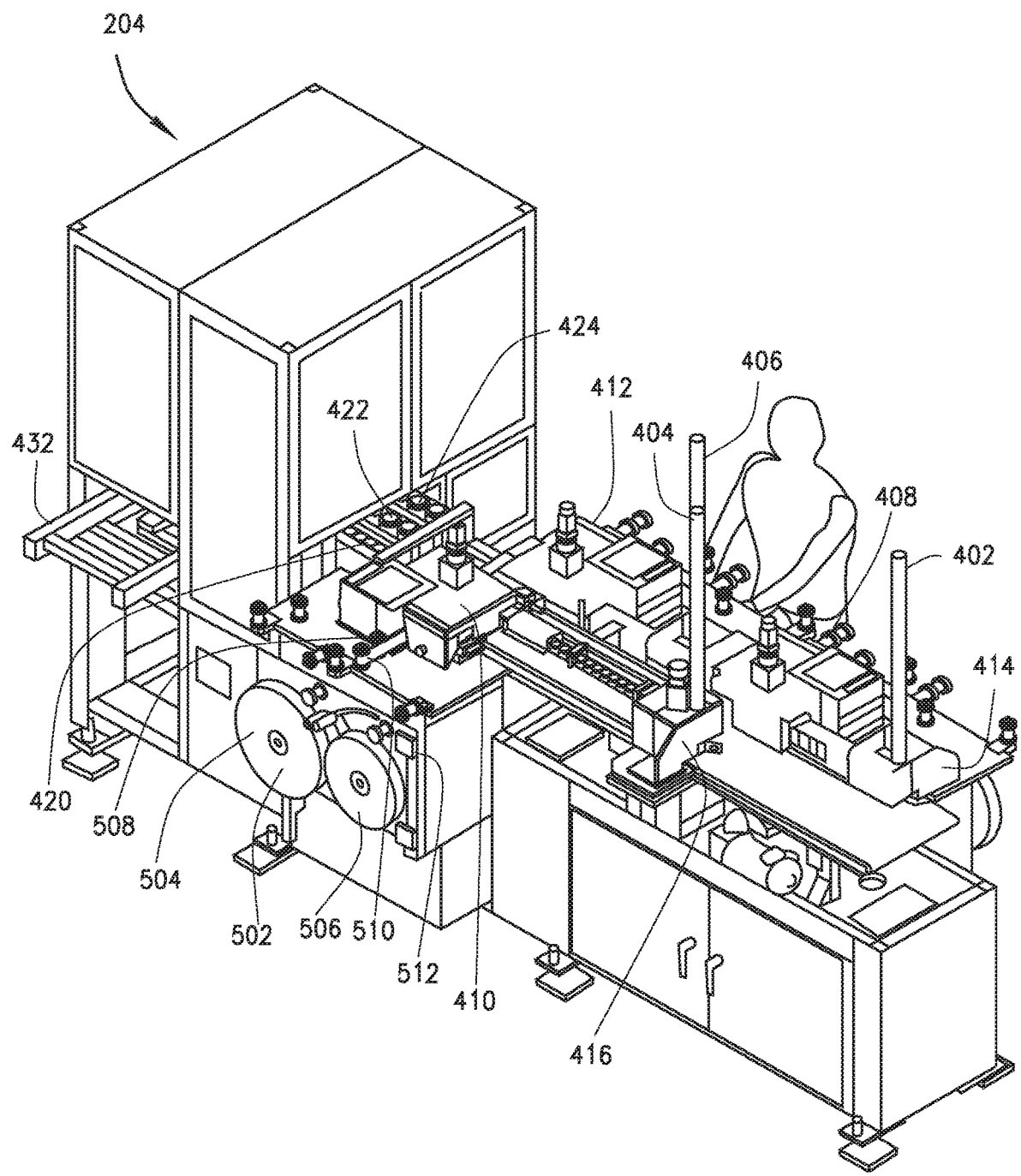
FIG. 5 is a top, perspective view of the loading subsystem of FIG. 4.
Figure 6:
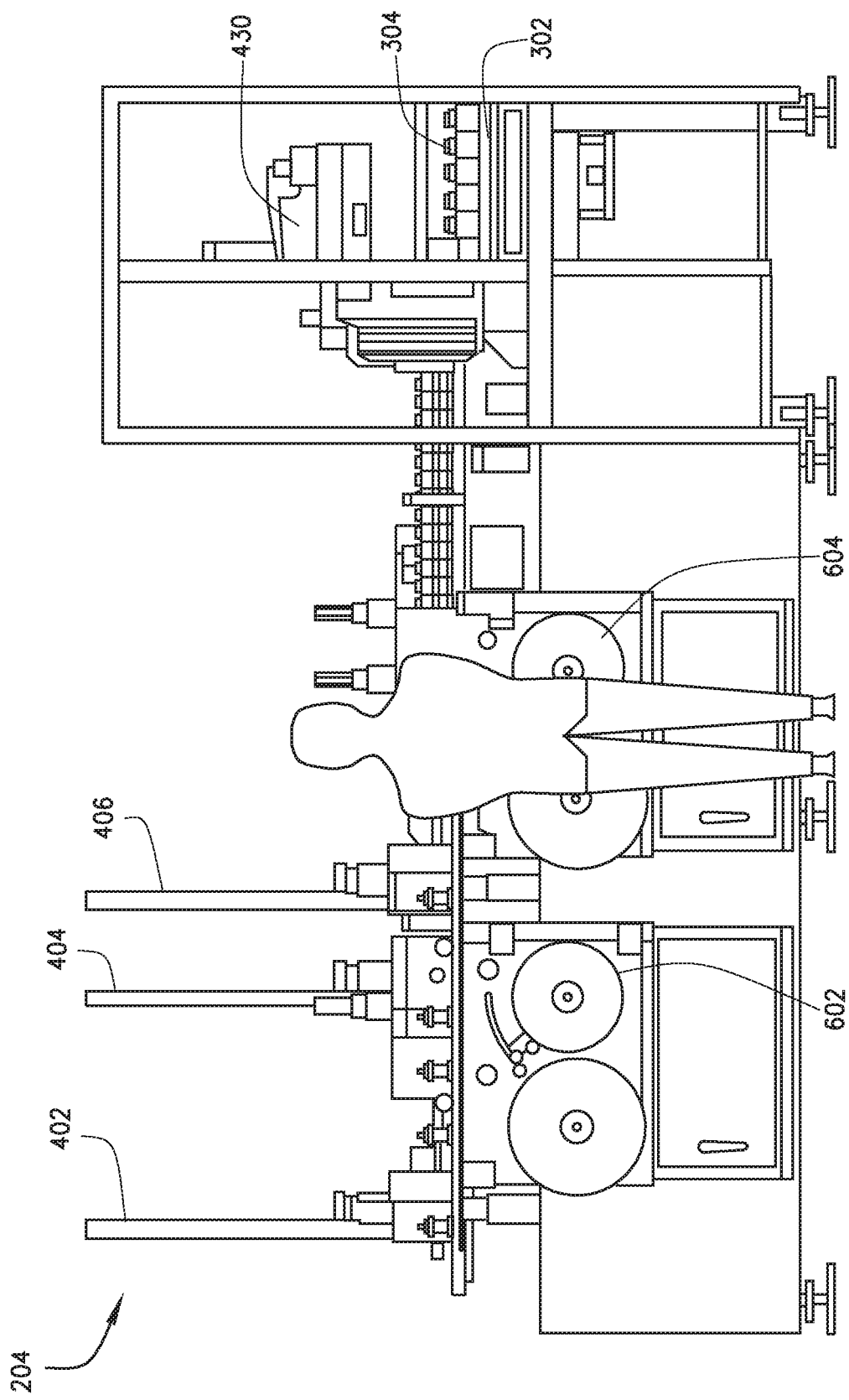
FIG. 6 is a side view of the loading subsystem of FIG. 4.

FIGS. 4-6 illustrate the loading subsystem 204, according to an example embodiment. The loading subsystem 204 may be deployed within the loading device 124, or may otherwise be deployed. The loading subsystem 204 enables labeling containers 304 with a label 306 and loading the labeled containers 304 onto the pallet 302. The label 306 may be a prescription label. A particular label 306 may include information such as information about the drug to be dispensed into a particular container 304 (e.g., the name, strength, possible side effects, dosage information, and/or other identifying characteristics about the drug), information about the patient for whom the drug has been prescribed, information about the prescriber, and/or other information relevant to and/or about a particular prescription that will be fulfilled (in whole or in part) with the drug to be dispensed into the particular container 304.

The loading subsystem 204 includes container drop tubes 402, 404, 406 adapted to receive containers 304 into container drop assemblies 414, 416, 418 of the loading subsystem 204. The container drop tubes 402, 404, 406 may be adapted to receive differently sized containers 304. For example, container drop tube 402 may be adapted to receive 200 cc containers 304, container drop tube 404 may be adapted to receive 75 cc containers 304, and container drop tube 406 may be adapted to receive 120 cc containers 304. In other embodiments, one or more than one of the container drop tubes 402, 404, 406 may be adapted to receive one or more other sizes of containers. More than one container drop tube 402, 404, 406 may be adapted to receive the same sizes of containers 304. Although three container drop tubes 402, 404, 406 are illustrated in FIGS. 4-6, fewer or more than three container drop tubes may be employed in the loading subsystem 204.

The container drop tubes 402, 404, 406 may be generally cylindrical, e.g., to receive containers 304 that are generally cylindrical. Other shapes of tubes may be used. Container drop tubes 402, 404, 406 may be formed of clear polycarbonate. Other suitable materials, such as metals or plastics, may be used to form the container drop tubes 402, 404, 406. The container drop tubes 402, 404, 406 may be substantially vertical, e.g., such that the container drop tubes 402, 404, 406 are perpendicular or substantially perpendicular to a surface (such as a floor) on which the loading subsystem 204 is placed.

Container drop assemblies 414, 416, 418 may receive the containers 304 from the container drop tubes 402, 404, 406 and transport the containers 304 into a label assembly 408, 410, 412. For example, as described in further detail below, container drop assemblies 414, 416, 418 may include a rotary unit that moves containers 304 exiting the bottom of the container drop tubes 402, 404, 406 onto a conveyor that transports the containers 304 into a label assembly 408, 410, 412. The rotary unit can move into engagement with the container 304 to rotate the container 304 such that the container 304 exits the container drop assembly in alignment with the respective label assembly. A motor, e.g., a stepper motor, may drive a drive wheel or drive belt to rotate the rotary unit.

The label assemblies 408, 410, 412 may print the labels 306 and apply the printed labels 306 to the containers 304. A label assembly 408, 410, 412 may be associated with a particular container drop tube 402, 404, 406 and a particular container drop assembly 414, 416, 418. For example, the container drop assembly 414 may be configured to receive the containers 304 from the container drop tube 402 and the label assembly 408 may be configured to apply the labels 306 to the containers 304 received into the container drop assembly 414. Similarly, the container drop assembly 416 may be configured to receive the containers 304 from the container drop tube 404 and the label assembly 410 may be configured to apply the labels 306 to the containers 304 received into the container drop assembly 416 and the container drop assembly 418 may be configured to receive the containers 304 from the container drop tube 406 and the label assembly 410 may be configured to apply the labels 306 to the containers 304 received into the container drop assembly 416. One or more of the label assemblies 408, 410, 412, the container drop tubes 402, 404, 406 and the container drop assemblies 414, 416, 418 may be otherwise configured to interact with one another.

The label assembly 408, 410, 412 associated with a particular container drop assembly 414, 416, 418 may be adapted to print a set of the labels 306, such as prescription labels. For example, a label assembly 408, 410, 412 may be respectively associated with a container drop assembly 414, 416, 418 adapted to receive a particular size of container 304 (such as a 75 cc, a 120 cc, or a 200 cc container) and may be adapted to print a first set of prescription labels 306 that includes a label 306 for each of such sized container 304 that will be placed on a first pallet 302. The label assembly 408, 410, 412 may be adapted to initiate printing a second set of labels 306 that includes a label 306 for each of such sized container 304 that will be placed on a second pallet 302 after all of such sized containers 304 that have received the labels 306 from the first set of prescription labels 306 have been placed on the first pallet 302. Printing may be otherwise initiated or performed. Although three label assemblies 408, 410, 412 are illustrated in FIGS. 4-6, fewer or more than three label assemblies may be employed in a loading subsystem 204. The labels 306 may be otherwise applied and/or containers 304 may pass through a loading subsystem 204 without receiving the label 306.

As described in further detail below, the label 306 may be applied to the container 304 by the label assembly 408, 410, 412. As also described in further detail below, label reel/de-reel assemblies 502, 602, 604 may be configured to provide a label template for the labels 306 to be printed by the label assemblies 408, 410, 412. In the embodiment illustrated in FIGS. 4-6, the label reel/de-reel assemblies 502, 602, 604 are placed vertically, on a face of the loading system 204, making them accessible for replacing or adding label templates. The label reel/de-reel assemblies 502, 602, 604 may be otherwise configured.

After receiving the label 306, a labeled container 304 may exit the label assembly 408, 410, 412 via a container conveyor 420, 422, 424. The container conveyors 420, 422, 424 may transport containers 304 into loading rotary wheels 426, 428. At the loading rotary wheels 426, 428, the labels 306 on the containers 304 may be read and containers 304 may be held in place to be selected by a robot arm 430 and placed onto the pallet 302. Labeled containers 304 may be otherwise used and/or gathered. The rotary wheels 426, 428 can move into engagement with a container 304 to rotate (e.g., spin) the container 304 such that the label, barcode, QR code, or other identifying information is visible to a scanner or align the container for engagement by the robot arm 430. A motor, e.g., a stepper motor, may drive a drive wheel or drive belt to rotate the rotary wheels 426, 428. Pockets of the rotary wheels 426, 428 may include bearings or free wheels to allow the container 304 to spin under force from a tensioner arm (as further described below). The free wheels in the pockets allow the container to rotate without damaging the label on the container 304. The reading of the label 306 will associate the container 304 with a particular drug, pallet, filling location, and prescription order.

In the embodiment illustrated in FIGS. 4-6, the loading rotary wheel 426 is provided for containers exiting the label assembly 410, wherein the label assembly 410, in this example, is adapted to apply the labels 306 to a particular size of the container 304 (such as a 75 cc container) and the loading rotary wheel 428 is provided for the containers 304 exiting both of the label assemblies 408, 412, wherein the label assemblies 408, 412, in this example, are adapted to apply the labels 306 to other particular sizes of the container 304 (such as a 120 cc container and a 200 cc container). In other embodiments, a loading rotary wheel may be provided for each of the label assemblies 408, 410, 412 and/or a single loading rotary wheel may be provided for all of the label assemblies 408, 410, 412. In an embodiment of the loading subsystem 204 that is adapted to label and load multiple sizes of containers 304, the quantity of loading rotary wheels may be selected based on the relative quantities of the containers 204 employed to fill pharmaceutical orders in the system 100 or portions thereof. For example, container sizes used less frequently may be combined at a single loading rotary wheel.

A pallet conveyor 432 may transport the pallets 302 through the loading device 124. When the loading device 124 is deployed in a system 100, the pallet conveyor 432 may transport the pallet through or to one or more of a pallet sizing and pucking device 122, an inspect device 126, a unit of use device 128, an automated dispensing device 130, a manual fulfillment device 132, a review device 134, an imaging device 136, a cap device 138, an accumulation device 140, a packing device 142, and/or a unit of use packing device 144, and/or may be in communication with one or more of such devices, e.g., via one or more additional pallets.

The pallet conveyor 432 may be a chain conveyor or a belt conveyer, e.g., a Bosch TS2 belt-driven conveyor. Other types of conveyors may be used for the pallet conveyor 432, such as a chain conveyor. In some embodiments, the pallet conveyor 432 is a low friction, high speed conveyor.

Although pallets are generally described herein as employed to move a group of the containers 304 through the system 100 or within the loading subsystem 204, trays or other types of carriers may be employed in some embodiments to move a group of the containers 304 through the system 100 or within the loading subsystem 204.

The robot arm 430 may be a low-weight bearing, high speed, high accuracy assembly-type robot arm. In a particular embodiment, the robot arm 430 is a selective compliance assembly robot arm ("SCARA"), such as a SCARA robot model number i800 from Adept Technology, Inc. Low weight may refer to less than ten pounds, less than five pounds, less than two pounds or less than one pound. Low weight may refer to at least the weight of a heaviest container used in the system 100. The robot arm 430 may include a rotatable arm that moves in an XY frame and is fixed in the Z directions. The robot arm 430 may perform complex movements in three dimensions in another example embodiment. The movement of the pickup head of the robot arm 430 may be in an annular travel path radially inwardly toward and outwardly from a base of the robot 430. Other types of robot arms may be used for the robot arm 430. The robot arm 430 may perform operations such as removing containers 304 from the loading rotary wheels 426, 428 and placing the containers 304 onto the pallet 302. Other operations may be performed by the robot arm 430. In some embodiments, operations of removing the containers from the loading rotary wheels 426, 428 or placing the containers 304 onto the pallet 302 may be performed without the use of the robot arm.

The robot arm 430 may be adapted to grip the containers 304. The containers 304 may be lifted and moved by the robot arm 430 from the loading rotary wheels 426, 428, released, and placed onto the pallet 302.

Figure 7:
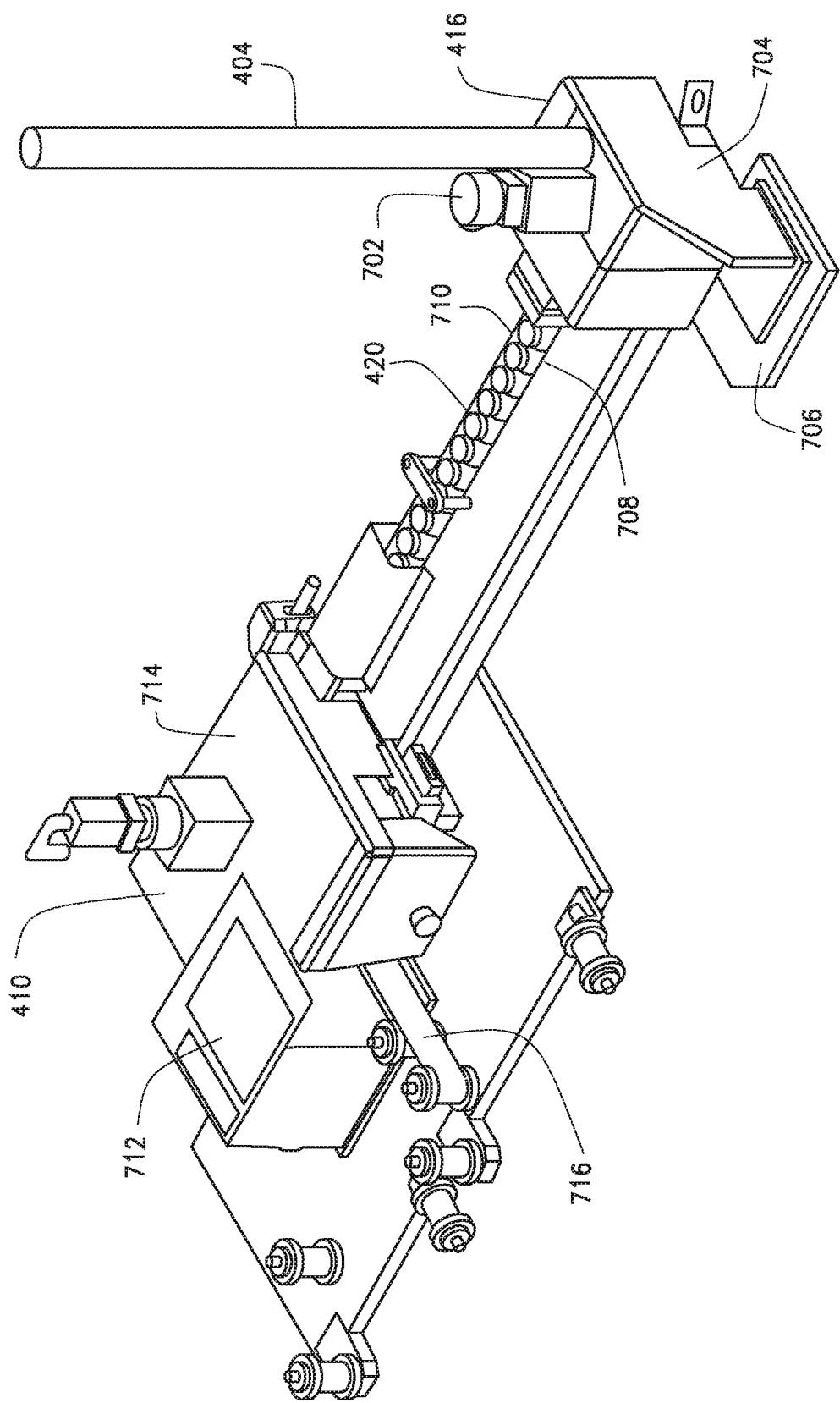
FIG. 7 is a side perspective view of a container drop assembly in communication with a label assembly of the loading subsystem of FIG. 4.
Figure 8:
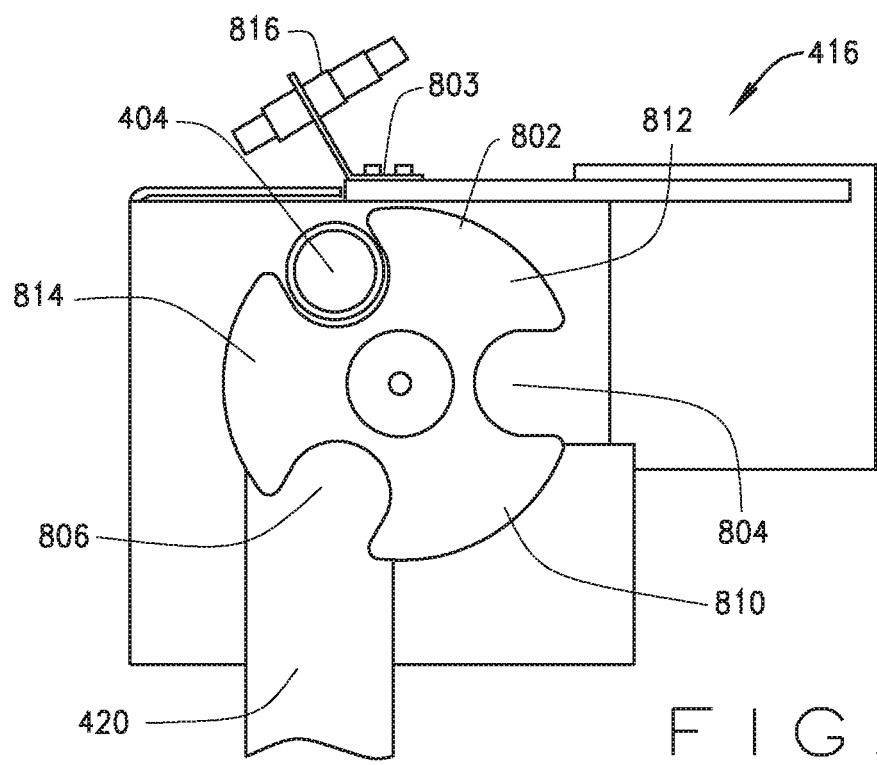
FIG. 8 is an top view of the container drop assembly of FIG. 7, in which certain hidden elements are illustrated via broken lines.
Figure 9:
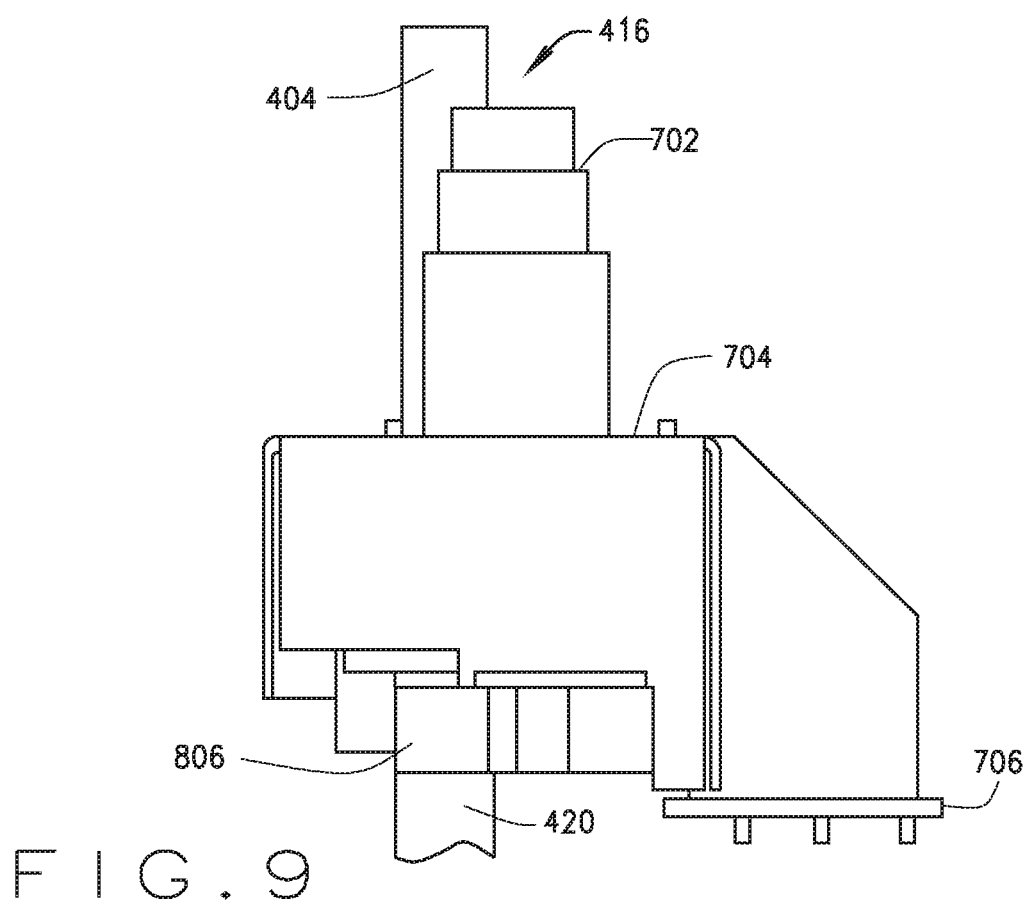
FIG. 9 is a side view of the container drop assembly of FIG. 7.
Figure 10:
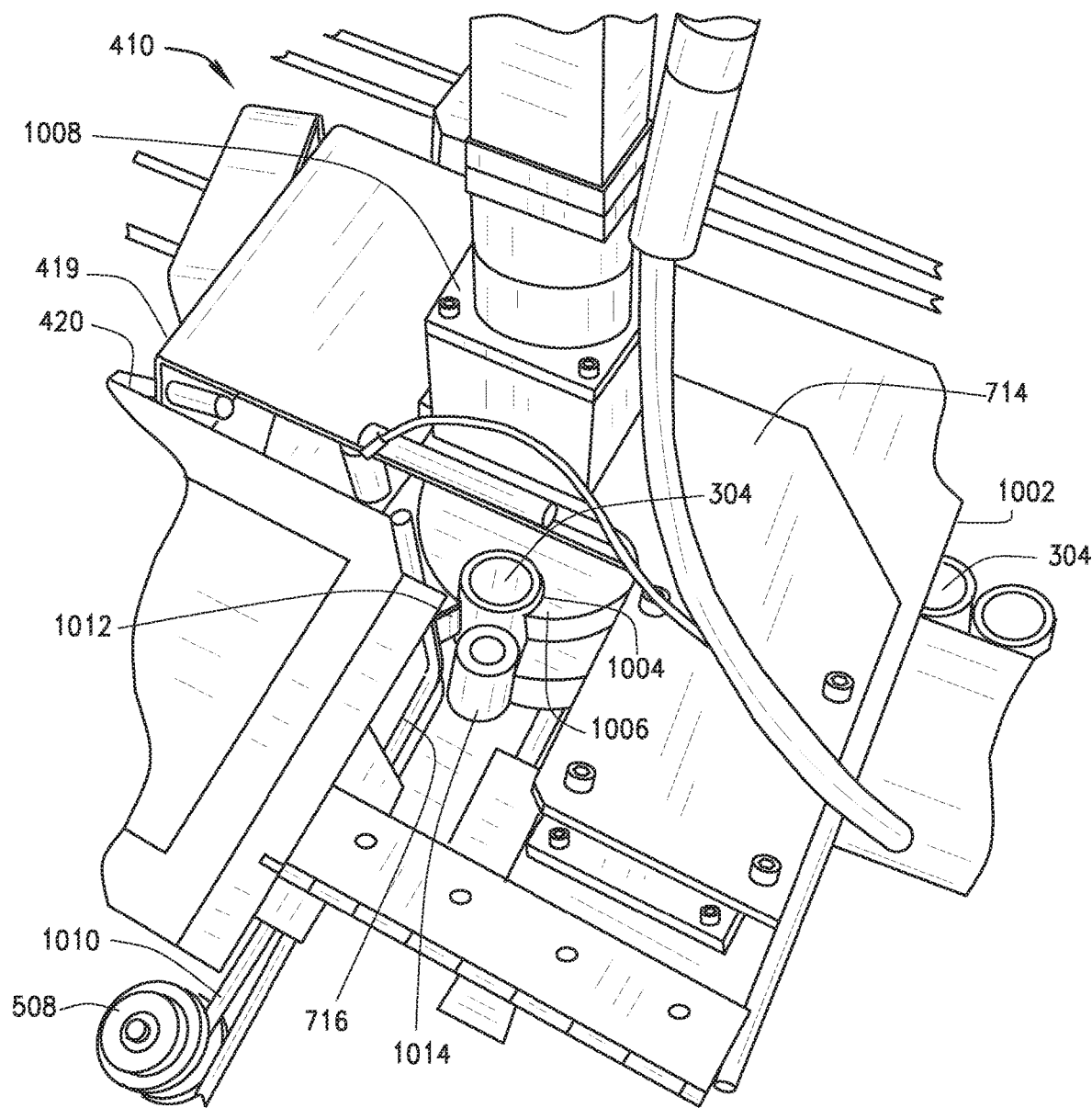
FIG. 10 is a top, perspective view of the label assembly of FIG. 7.
Figure 11:
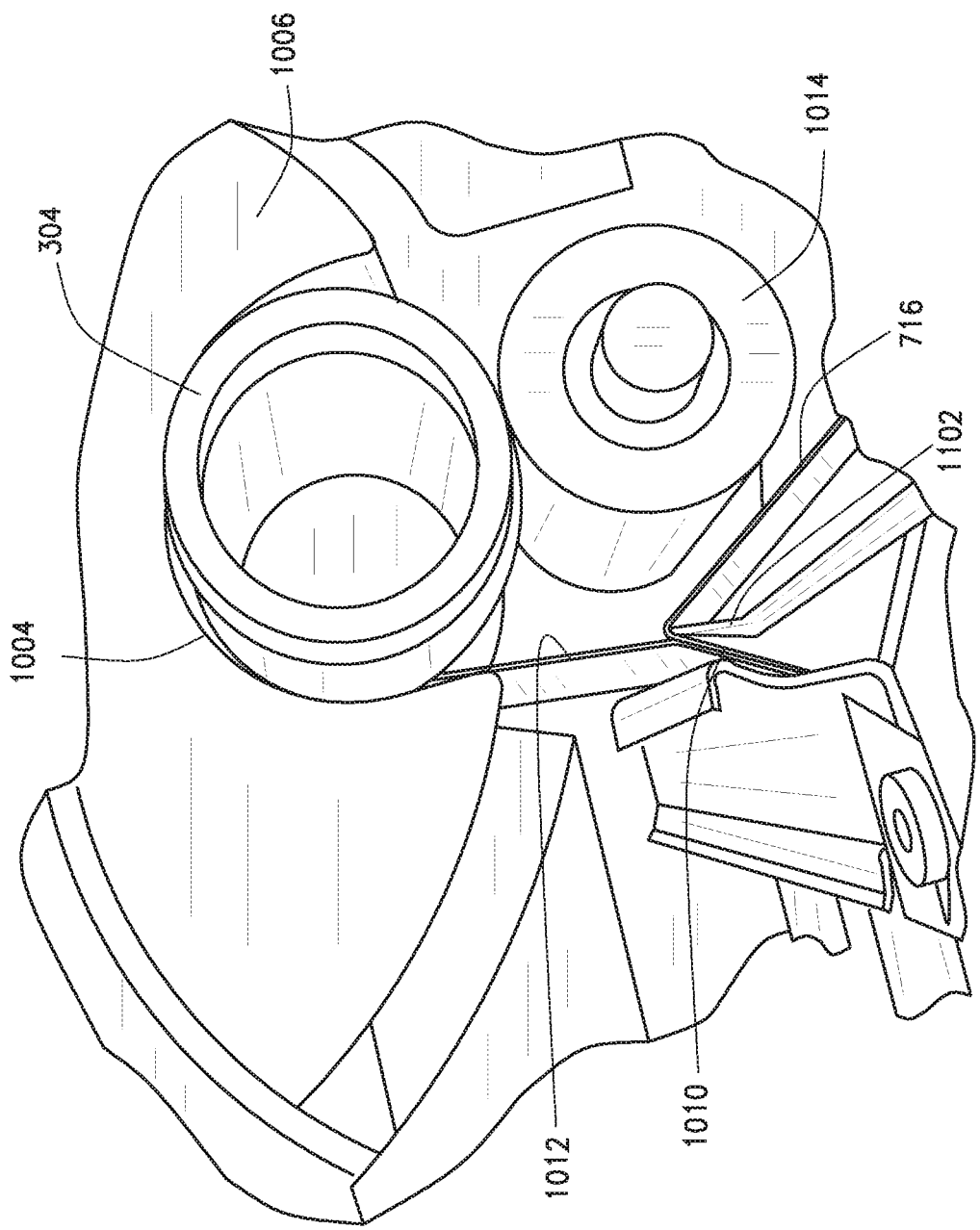
FIG. 11 is a top, close-up view of a portion of the label assembly of FIG. 7.

Referring to FIGS. 7-11 in combination with FIGS. 4-6, FIG. 7 illustrates the container drop assembly 416 in communication with the label assembly 410 via the container conveyor 420 in further detail. FIGS. 8 and 9 are views of the container drop assembly 416. FIGS. 10 and 11 are views of the label assembly 410.

The containers 304 are received into the container drop assembly 416 via the drop tube 404. A container drop motor 702 actuates a container drop rotary wheel 802. The container drop motor 702 may be a brushless motor with a parallel shaft gearhead. In a particular embodiment, the container drop motor 702 is a BLU series brushless motor with a 30:1 gear ratio, 23 lb-in torque, and a parallel shaft gearhead from Oriental Motor U.S.A. Corp. Other types of motors may be used for the container drop motor 702.

The container drop rotary wheel 802 includes container drop pockets 804, 806, 808 adapted to receive the container 304 dropped into the container drop assembly 416 via the drop tube 404. The drop tube 404 terminates above the container drop rotary wheel 802, such that when an open container drop pocket 804, 806, 808 (e.g., a container drop pocket 804, 806, 808 that is not then retaining a container 304) is beneath the end of the drop tube 404, the container 304 will fall from the drop tube 404 into the open container drop pocket 804, 806, 808. Spacers 810, 812, 814 between the container drop pockets 804, 806, 808 may prevent the container 304 from exiting the drop tube 404 until an open container drop pocket 804, 806, 808 is beneath the end of the drop tube 404. In an example embodiment, the bottom of the next container 304 in the drop tube 404 rides on the spacer until an open drop pocket aligns with the drop tube 404 and the container 304. A container drop sensor 816 may be configured to determine whether the container 304 is in the container drop pocket 804, 806, 808 when at the position of the container drop pocket 808 as illustrated on FIG. 8. The container drop sensor 816 may be an ultrasonic sensor. In a particular embodiment, the container drop sensor 816 is an ultrasonic sensor with a sensing range of between 30 and 300 millimeters from Banner Engineering Corp. Other types of sensors may be used for the container drop sensor 816.

If a container is not in the container drop pocket 804, 806, 808 at the position of the container drop pocket 808 on FIG. 8, the container drop rotary wheel 802 may be retained in that position until the container 304 is received into the container drop pocket 804, 806, 808 from the drop tube 404 that is at the position of the container drop pocket 808 on FIG. 8. When the container 304 is in the container drop pocket 804, 806, 808 at the position of the container drop pocket 808 on FIG. 8, the drop tube motor 702 may actuate the container drop rotary wheel 802, causing it to turn (e.g., clockwise or counterclockwise). In the embodiment illustrated on FIG. 8, the container drop rotary wheel 802 will turn clockwise.

The container drop assembly 416 includes a housing 704 with a riser 706 that holds the container drop rotary wheel 802 above the container conveyor 420. The container conveyor 420 may move under the container drop rotary wheel 802, such that when the container drop pocket 804, 806, 808 at the position of the container drop pocket 806 on FIG. 8, friction between the container 304 in the container drop pocket 804, 806, 808 at the position of the container drop pocket 806 on FIG. 8 will enable the container conveyor 420 to pull the container 304 from the container drop pocket 804, 806, 808. The container 304 may then exit the container drop assembly 416 via the container conveyor 420.

The container conveyor 420 may be a belt conveyor or a chain conveyor. In an example embodiment, the container conveyor 420 is a Dorner 2200 series modular belt conveyor. Other conveyors that establish sufficient friction with a container to enable the container conveyor 420 to perform the functions described above may be employed as the container conveyor 420.

An inner container guide 708 and an outer container guide 710 may maintain the containers 304 in single file on the container conveyor 420 as they move from the container drop assembly 416 into the label assembly 410.

The label assembly 410 includes a print engine 712. The print engine 712 may be a thermal transfer or direct transfer printer. The maximum print width of the print engine 712 may be approximately equal to or greater than the width of the label 306. In an example embodiment, the print engine 712 has a maximum print width of approximately 4 millimeters. In an example embodiment, the print engine 712 has a maximum print speed of approximately 300 millimeters per second. The print engine 712 may have a maximum print speed of more than or less than 300 millimeters per second. In a particular embodiment, the print engine 712 is a Zebra® ZE500 series print engine, such as the Zebra® ZE500-4 print engine. Other types of print engines may be used for the print engine 712.

As illustrated by FIG. 4 in combination with FIGS. 7, 10 and 11, the label assembly 410 may include a labeler wheel assembly 714, which may receive containers 304 through an entrance 1002. The labeler wheel assembly 714 may include a label wheel 1006. The containers 304 may be received into a label wheel pocket 1004 of label wheel 1006. The label wheel 1006 may be actuated by a label wheel motor 1008. Although one label wheel pocket 1004 is illustrated in FIGS. 9 and 10, the label wheel 1006 may include more than one label wheel pocket 1004. For example, the label wheel 1006 may include two, three, four or more than four label wheel pockets.

The print engine 712 may be configured to receive a label template 1010. The label template 1010 may include a backing 716 and an adhesive portion 1012. The label template 1010 may be received and the adhesive portion 1012 may be printed by the print engine 712 to become the labels 306.

Referring to FIG. 5 in combination with FIGS. 10 and 11, the label reel/de-reel assembly 502 may include an unwind spool 504 and a wind spool 506, each of which may be actuated by a motor. The label template 1010 may be fed from the unwind spool 504, along an in-bound roller 508, through the print engine 712 and then, as the backing 716 (e.g., the label template 1010 after the adhesive portion 1012 printed as the labels 306 has been removed), along an out-bound roller 510 to the wind spool 506. The wind spool 506 may have a tensioning arm 512 configured to maintain tension on the label template 1010 appropriate to enable proper printing of the labels 306.

Thus, the unwind spool 504 and the wind spool 506, in combination, may release the label template 1010 from the unwind spool 504, pull the label template 1010 through the print engine 712, and pull the spent backing 716 onto the wind spool 506.

The label template 1010 may be pulled through the label assembly 410 in a first direction along a first side of a peel plate 1102 as it is being printed. The peel plate 1102 may be provided as a component of the print engine 712. It may be substantially rectangular with a narrowed edge and may be configured such that a vertical surface of the peel plate 1102 is substantially parallel to the printed surface of the label template 1010 as it is pulled through the label assembly 410, such that the narrowed edge creates a sharp turn against which the label template 1010 may be pulled. After the adhesive portion 1012 of the label template 1010 has been printed, the label template 1010 may be pulled around the edge of the peel plate 1102. The adhesive portion 1012 may separate from the backing 716 as the label template 1010 is pulled around the edge of the peel plate 1102, such that adhesive portion 1012 (now printed as the label 306) extends beyond, and substantially in line with the peel plate 1102 while the backing 716 is pulled back along the peel plate 1102. As the label 306 extends beyond the peel plate 1102, the adhesive back of the label 306 may engage a container 304 within the label wheel pocket 1004 of the label wheel 1006. A wrap wheel 1014 may rotate the container 304 as the label 306 begins to adhere to it, such that the label 306 is pulled on to and wrapped around the container 304. The wrap wheel 1014 may be further adapted to press the label 306 onto the container 304 as the container rotates within the label wheel 1006. The label wheel pocket 1004 of the label wheel 1006 may include bearings or free wheels to allow the container 304 to spin under force from the wrap wheel 1014. The free wheels in the pockets allow the container to rotate without damaging the label on the container 304.

After the label 306 has been placed onto the container 304, the label wheel motor 1008 may turn the label wheel 1006 such that the label wheel pocket 1004 is open toward an exit 419 of the labeler wheel assembly 714. The container conveyor 420 moves under the label wheel 1006, such that when the label wheel pocket 1004 is open toward the exit 419, friction between the container 304 in the label wheel pocket 1004 will enable the container conveyor 420 to pull the container 304 from the label wheel pocket 1004 and out of the labeler wheel assembly 714 through the exit 419 via the container conveyor 420.

For purposes of clarity and ease of explanation, the container drop assembly 416, the label assembly 410, the label reel/de-reel assembly 502, and various component parts thereof have been illustrated and described in more detail than the container drop assemblies 414, 418, the label assemblies 408, 412 and the label reel/de-reel assemblies 602, 604. The container drop assemblies 414, 418, the label assemblies 408, 412 and the label reel/de-reel assemblies 602, 604 may include (as applicable) the features and functions of the container drop assembly 416, the label assembly 410 or the label reel/de-reel assembly 502 that are described and illustrated in more detail in reference to FIGS. 7-11. In some embodiments, one or more than one features or components of the container drop assembly 416, the label assembly 410, or the label reel/de-reel assembly 502 may be omitted (as applicable) from the container drop assemblies 414, 41, the label assemblies 408, 412 or the label reel/de-reel assemblies 602, 604 and/or one or more of the container drop assemblies 414, 418 the label assemblies 408, 412 or label reel/de-reel assemblies 602, 604 may include additional features and/or components.

Figure 12:
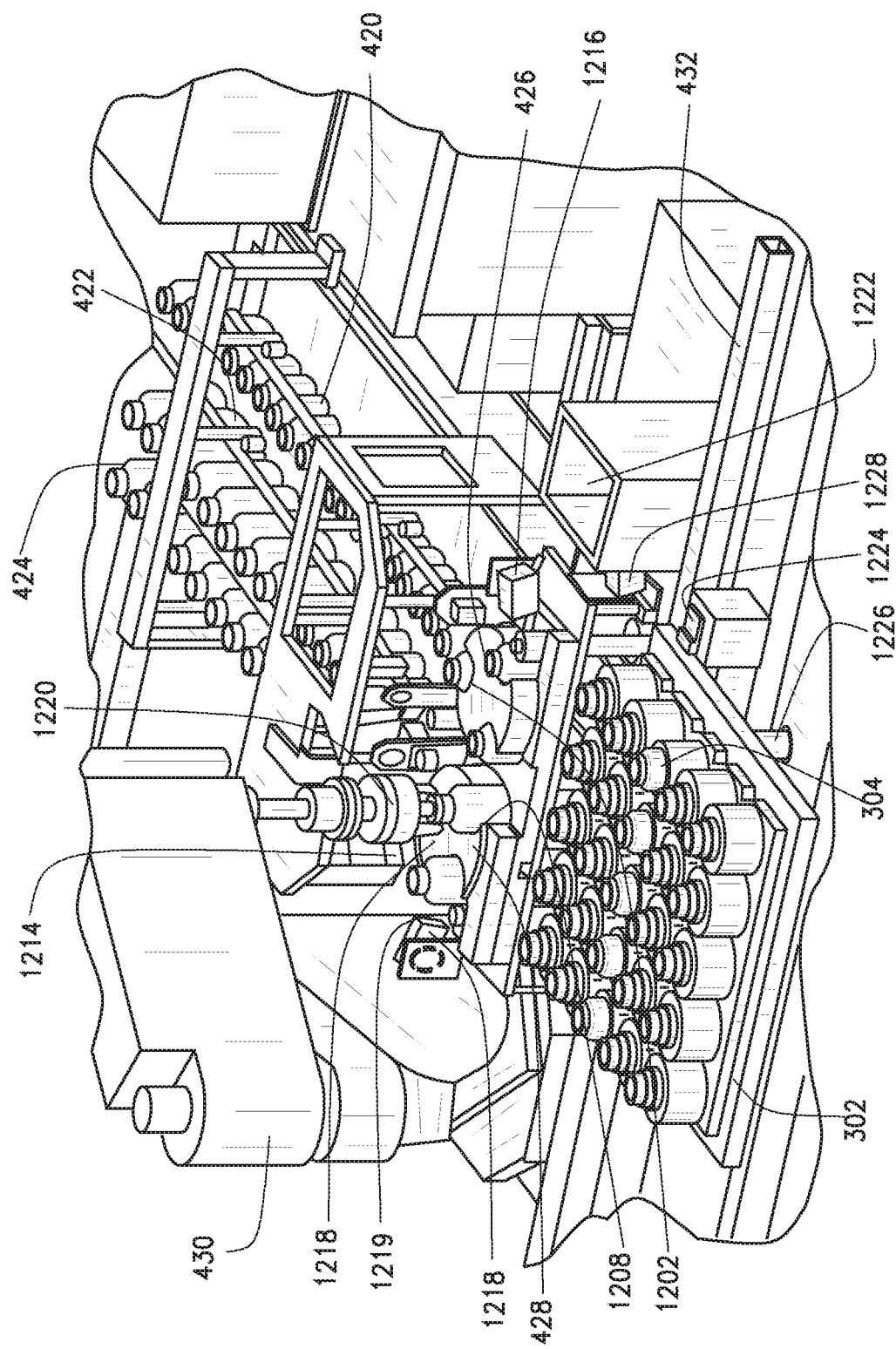
FIG. 12 is a side, perspective view of a portion of the loading subsystem of FIG. 4.
Figure 13:
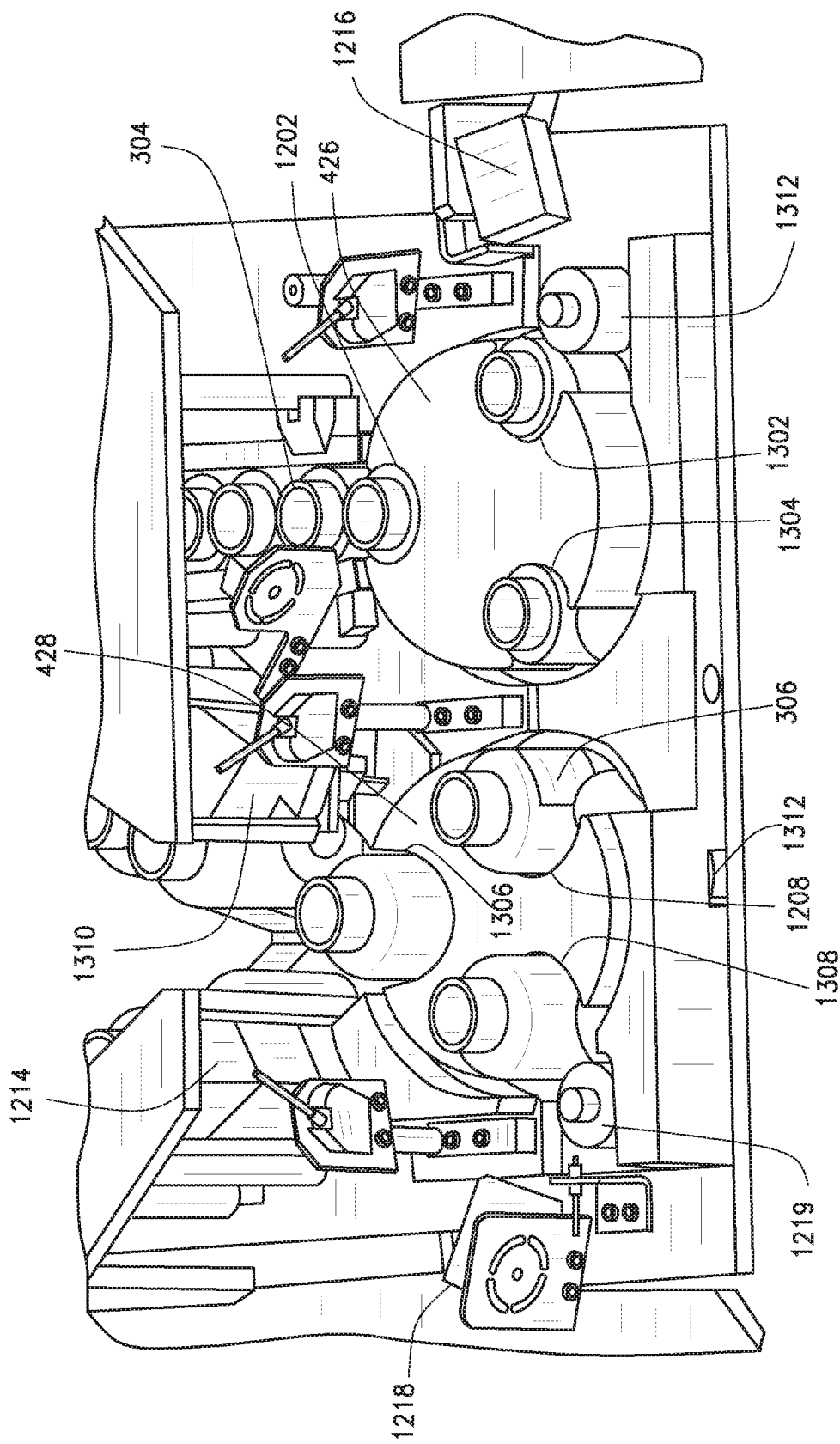
FIG. 13 is a top, perspective, close-up view of a portion of the loading subsystem of FIG. 4.

FIGS. 12 and 13 illustrate in more detail those components of the loading subsystem 204 configured to assemble and load the labeled containers 304 onto a pallet 302. Thus, as described above, the container conveyors 420, 422, 424 transport the labeled containers 304 from the label assemblies 408, 410, 412 to the loading rotary wheels 426, 428.

The loading rotary wheel 426 may include pockets 1202, 1302, 1304 adapted to receive the containers 304 from the container conveyor 420 and the loading rotary wheel 428 may include pockets 1208, 1306, 1308 adapted to receive the containers 304 from the container conveyors 422, 424. The loading rotary wheel 426 may be adapted to receive the containers 304 from the container conveyor 420 when one of the pockets 1202, 1302, 1304 is in the position of the pocket 1202 as illustrated in FIGS. 12 and 13. Actuators 1310, 1214 may be configured to allow one of the containers 304 from either the container conveyor 422 or the container conveyor 424 to enter the loading rotary wheel 428 at a particular time. The loading rotary wheel 428 may be adapted to receive the container 304 from the container conveyor 422 or the container conveyor 424 when one of the pockets 1208, 1306, 1308 is in the position of the pocket 1302 as illustrated in FIG. 13.

The loading rotary wheels 426, 428 may be adapted to rotate to a position at which a scanner 1216, 1218 reads the label 306 on the container 304, e.g., when the container 304 is in the position of the pocket 1302 of the loading rotary wheel 426 or the pocket 1304 of the loading rotary wheel 428, as illustrated on FIGS. 12 and 13. A tensioner arm 1312, 1219 may be adapted to spin the container 304 to enable the scanner 1216, 1218 to read the label 306.

The loading rotary wheels 426, 428 may be further adapted to rotate to a pick position (e.g., the position of the pocket 1304 of the loading rotary wheel 426 or the pocket 1208 of the loading rotary wheel 428, as illustrated on FIGS. 12 and 13) at which a gripper head 1220 of the robot arm 430 may be configured to grip the container 304 in the pick position after the label 306 on the container 304 has been read by the scanner 1216, 1218. The robot arm 430 may then move the container 304 from the pick position of the loading rotary wheel 426, 428 to the cavity 310 on the pallet 302 that has been designated (e.g., by the control subsystem 202) to receive that particular container 304. Information regarding the designated cavity 310 may be stored as a container identifier on the RFID tag 308 and read by the RFID reader 1228. The gripper head 1220 may release the container into the cavity 310. The gripper head 1220 may be a pneumatic gripper head. In an example embodiment, the gripper head 1220 is spring assist closed. In another an example embodiment, the gripper head 1220 is spring assist open.

In an embodiment in which the loading rotary wheel_428 is configured to receive more than one size of the container 304, a spring-loaded finger 1312 may be configured to hold the container 304 in position when it is at the pick positon.

If the label 306 on the container 304 cannot be read by the scanner 1216, 1218, the robot arm 430 and the gripper assembly 1220 may be further configured to remove the container 304 from the pick position and drop the container 304 into a rejection bin 1222. In an example embodiment, the container 304 is not moved into the rejection bin 1222 unless the scanner 1216, 1218 has failed to read the label 306 after a pre-determined number of times, such as once, twice, three times, or more than three times. In an example embodiment, the robot arm 430 is configured to drop the container into the rejection bin 1222 if the label 306, as read by the scanner 1216, 1218, is identified as a duplicate of another label 306 that has been read by the scanner 1216, 1218.

The pallet 302, after entering the loading subsystem 204, may be engaged by a stop 1224 and lifted by a lift 1226, such that the pallet conveyor 432 can pass underneath the pallet and the pallet can be oriented and held in position to receive the containers 304 via the robot arm 430. In an example embodiment, the lift 1226 raises the pallet just slightly above the pallet conveyor 432. For example, the lift 1226 may raise the pallet 304 less than approximately an inch or less than approximately one-half inch above the pallet conveyor 432. In another embodiment, the lift 1226 may raise the pallet 304 more than one inch above the pallet conveyor 432.

The loading subsystem 204 may include an RFID reader 1228. The RFID reader 1228 may read data on the RFID tag 308 of the pallet 302 to obtain data associated with the particular pallet 302 and/or containers 304 to be loaded onto the pallet 302, such as order data 110, member data 112, claims data 114, drug data 116, prescription data 118, and/or plan sponsor data 120 associated with prescriptions (or portions of prescriptions) to be filled using containers 304 on that pallet 302. The RFID reader 1228 may write data to the RFID tag 308 of a pallet 302 (or otherwise cause data to be associated with the pallet 302), such as order data 110, member data 112, claims data 114, drug data 116, prescription data 118, and/or plan sponsor data 120 associated with pharmaceuticals to be dispensed into containers 304 on the pallet 302 via the automated dispensing device 130. Although only one RFID reader 1228 is illustrated on FIG. 12, more than one RFID reader 1228 may be employed in a loading subsystem 204. When more than one RFID reader 1228 is employed in a loading subsystem 204, each RFID reader 1228 may be adapted to read the RFID tag 308 on a pallet 302 at a different stage. For example, an RFID reader may read the RFID tags 308 of pallets as they queue for entry into the loading subsystem 204, another may read the RFID tags 308 of pallets as they enter the loading subsystem 204, and another may read the RFID tags 308 of pallets 302 as they exit the loading subsystem 204.

The RFID reader 1228 and/or another RFID reader may read the pallet identifier and the container identifiers on the RFID tag 308 when it enters the loading subsystem 204 and may write the group status and a loading subsystem identifier onto the RFID tag 308 of the pallet 302 after the labeled containers 304 have been loaded onto the pallet 302.

Figure 14:
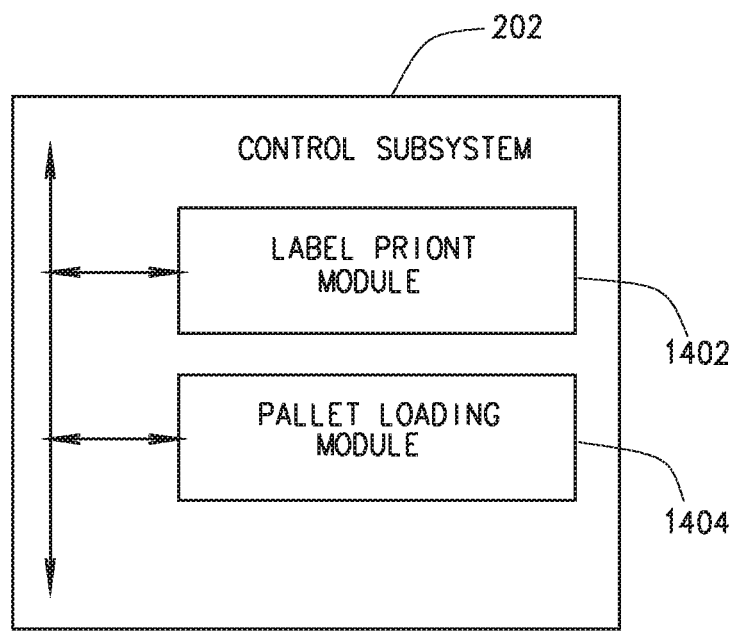
FIG. 14 is a diagram of a control subsystem that may be deployed within the automated dispensing device of FIG. 2, according to an example embodiment.

FIG. 14 illustrates an example control subsystem 202 that may be deployed in the order processing device 102, the loading device 124, or otherwise deployed in the system 100. One or more modules are communicatively coupled and included in the control subsystem 202 to enable control of the automated dispensing operations of the loading device 124. The modules of the control subsystem 202 that may be included are a label print module 1402 and a pallet loading module 1404. Other modules may also be included.

In some embodiments, the modules of the control subsystem 202 may be distributed so that some of the modules are deployed in the order processing device 102 and some modules are deployed in the loading device 124. In one embodiment, the modules are deployed in memory and executed by a processor coupled to the memory. The functionality contained within the modules 1402-1404 may be combined into a lesser number of modules, further divided among a greater number of modules, or redistributed among existing modules. Other configurations including the functionality of the modules 1402, 1404 may be used. A module may include hardware, software and combinations thereof.

The label print module 1402 may accesses data, such as the order data 110, the member data 112, the claims data 114, the drug data 116, the prescription data 118, and/or the plan sponsor data 120, associated with a particular prescription and, more specifically, a particular drug to be dispensed in accordance with that prescription to select information that will be printed on a particular one of the labels 306 to be placed on one of the containers 304. The label print module 1402 may also access such data to determine the size of the container 304 that will be used to receive the drug, in fulfilling the particular prescription. The label print module 1402 may cause the loading station RFID reader 1228 to read data from the RFID tag 308 of the pallet 302.

The label print module 1402 may select a particular one of the label assemblies 408, 410, 412 to print a set of the labels 306 (wherein the content of each label of the set of labels 306 has been selected as described above) and may determine the order in which the labels 306 will be printed and when the label assemblies 408, 410, 412 will be engaged to print another set of the labels 306. The label print module 1402 may control operations of the loading subsystem 204 to cause the label assemblies 408, 410, 412 to print a set of the labels 306 (e.g., in respect of the label assembly 410, via the print engine 712) and to cause the label reel/de-reel assemblies 502, 602, 604 to move the label templates 712 through the label assemblies 408, 410, 412 at a rate suitable for enabling the printed labels 306 to be affixed to the containers 304 via the label assemblies 408, 410, 412.

In an embodiment of the loading subsystem 204 in which each of the label assemblies 408, 410, 412 is associated with a particular size of the container 304, the label assembly 408, 410, 412 at which a particular label 306 will be printed may be based on the size of the container 304 to be used to fill the prescription with which the particular label 306 is associated. A particular set of the labels 306 to be printed by a particular one of the label assemblies 408, 410, 412 may be selected based on the pallet 302 on which the labeled containers 304 are intended to be placed. For example, and as described above, the label print module 1402 may control the operations of the loading subsystem 204 to cause a particular label assembly 408, 410, 412 to print a first set of prescription labels 306 that includes a label 306 for each of such sized container 304 that will be placed on a particular pallet 302. The label print module 1402 may receive or access data (e.g., from the pallet loading module 1404) that identifies a set of labeled containers 304 (e.g., all of the labeled containers 304 of a particular size) as having all been placed onto the pallet 302. In some embodiments, the label print module 1402 may receive or access data (e.g., from the pallet loading module 1404) that identifies one or more than one of the labeled containers 304 to be loaded onto a particular pallet 302 as missing (which may occur, for example, if the label 306 on the container 304 could not be read by the scanner 1216, 1218) and, in such event, the label print module 1402 may control operations of one or more the one of the label assemblies 408, 410, 412 to re-print (or print) the label 306 associated with the missing container 304.

After the label print module 1402 receives information that all of the labeled containers 304 of a particular set have been placed on a particular pallet 302, the label print module 1402 may then control the operations of the label assembly 408, 410, 412 to cause a second set of labels 306 to be printed. Operations of identifying a set of labels 306 to be printed and/or initiating printing of a set of labels 306 may be otherwise performed. In an example embodiment, labels 306 may be printed substantially continuously (e.g., not as sets of labels).

The label print module 1402 may also select an order in which a particular set of labels 306 will be printed. Selections may be made by the label print module 1402 may be made based on a pallet configuration (e.g., the association of each of the cavities 310 on a pallet with an order for a particular type and quantity of a pharmaceutical) that has been selected by one or more other devices in the system 100, such as the pallet sizing and pucking device(s) 122. In an example embodiment, the selection of the order in which a particular set of labels 306 will be printed may be based on a selected sequence for placing the labeled containers 304 into the cavities 310 on the pallet 302, based on the selected configuration of that particular pallet 302. For example, a loading subsystem 204 may be generally configured to place the containers 304 on the pallet 302 in a sequence that begins at a first position, such as a corner position (e.g., an upper right corner, an upper left corner, a lower right corner, or a lower left corner) and ends at a final position, such as another corner position. In this example, the printing order of a set of labels 306 may be selected to facilitate the selected sequence in which the containers 304 will be placed on the pallet 302; specifically, such that the labelled containers 304 will arrive at the pick positions of the loading rotary wheels 426, 428 in the order in which they have been selected for loading onto the pallet 302. Other factors may be employed in selection of the order in which a particular set of labels 306 will be printed.

The pallet loading module 1404 may control the operations of the scanners 1216, 1218 and, based on a comparison of the data read from the label 306 of a container 304 with the pallet configuration data (e.g., data read from the RFID tag 308 of the pallet 302 that associates each cavity 310 on the pallet with a particular order) to determine the cavity 310 into which the container 304 at the pick position of the loading rotary wheel 426, 428 will be placed and may control the operations of the robot arm 430 and the gripper head 1220 to perform the steps of gripping and removing the container 304 from the pick position, moving the container 304 to the cavity 310 into which the particular container 304 is to be placed, and releasing the container 304 into the cavity 310.

The pallet loading module 1404 may control the operations of the loading subsystem 204 to cause the pallet 302 to be loaded in a sequence that conforms or substantially conforms to the sequence selected for loading the pallet 302. For example, in an embodiment in which the loading rotary wheel 426, 428 receives the containers 304 from more than one container conveyor 420, 422, 424, the pallet loading module 1404 may control the operations of the actuators 1212, 1214 such that the containers 304 (e.g., the containers from the container conveyors 422, 424) will enter the loading rotary wheel (e.g., the loading rotary wheel 428) in a sequence that corresponds to the sequence selected for loading the pallet 302.

The pallet loading module 1404 may control the operations of the robot arm 430 and the gripper head to perform the steps of dropping the container 304 into the rejection bin 1222 if the label 306 on the container 304 cannot be read by the scanner 1216, 1218 or if the identity of the labeled container 304 (e.g., as determined based on information read by the scanner 1216, 1218) does not correspond to any cavity 310 on the pallet.

The pallet loading module 1404 may control the operations of the loading subsystem 204 to cause the pallet 302 to be released from the loading subsystem 204 (e.g., by lowering the lift 1226 and disengaging the stop 1224) after all labeled containers 304 have been placed onto the pallet 302. The pallet loading module 1304 may cause the RFID reader 1228 to write data to the RFID tag 308 of the pallet 302, such as data indicating the pallet 302 has been processed through the loading subsystem 204.

Figure 15:
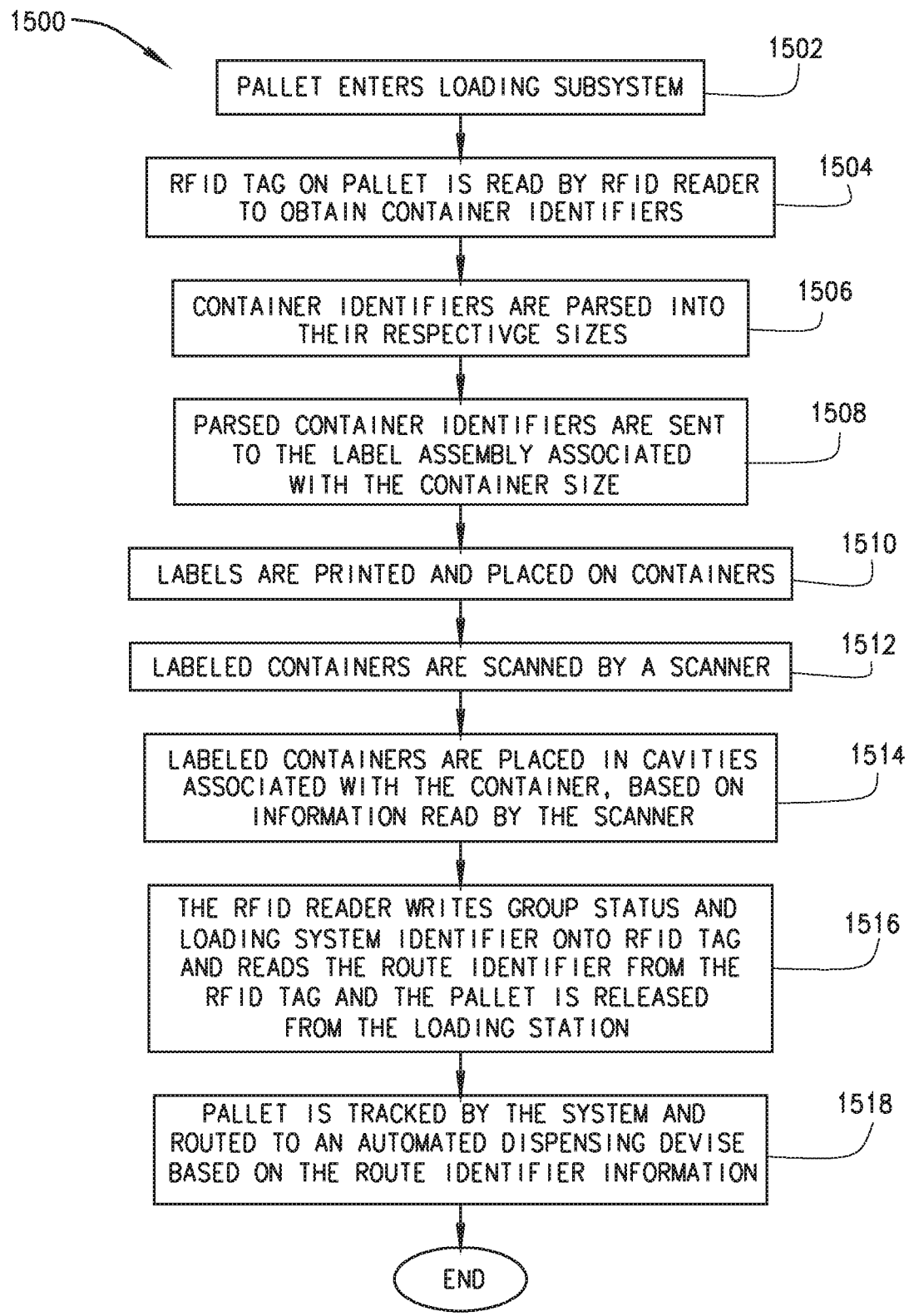
FIG. 15 is an example process flow illustrating a method of loading a pallet with labeled containers, according to an example embodiment.

FIG. 15 illustrates a method 1500 for labeling containers 304 and loading the labelled containers 304 onto a pallet 302, according to an example embodiment. The method 1500 may be performed by the loading device 122, partially by the order processing device 102 and partially by the loading device 122, or may be otherwise performed.

At block 1502, the pallet 302 enters the loading subsystem 204. At block 1504, the RFID tag 308 on the pallet 302 is read by the RFID reader 1228 to obtain the container identifiers of the containers 304 to be labeled and loaded onto the pallet 302. At block 1506, the container identifiers are parsed into their respective sizes (e.g., the container identifiers for each size of container 304 available at the loading subsystem 204). The parsed container identifiers are sent to the label assembly 408, 410, 412 associated with the particular size of the container 304 at block 1508.

At block 1510, labels are printed by the label assemblies 408, 410, 412 and placed onto the containers 304. The labeled containers 304 are scanned by the scanners 1216, 1218 when in position in the loading rotary wheel 426, 428 at block 1512. At block 1514, the labeled containers 304 are placed into the specific cavities 310 associated with the container identifier that matches the information read by the scanner 1215, 1218. At block 1516, the RFID reader 1228 writes the group status and the loading system identifier onto the RFID tag 308, reads the route identifier from the RFID tag 308, and the pallet 302 is released after all the labeled containers 304 have been placed onto the pallet 302. The pallet 302 is tracked by the system 100 and routed to an automated dispensing device 130 within the system 100 based on the route identifier at block 1518.

At block 1516, the pallet 302 is released after all the labeled containers 304 have been placed onto the pallet 302. At block 1518, the pallet is tracked by the system and routed to an automated dispensing device based on the route identifier information.

Figure 16:
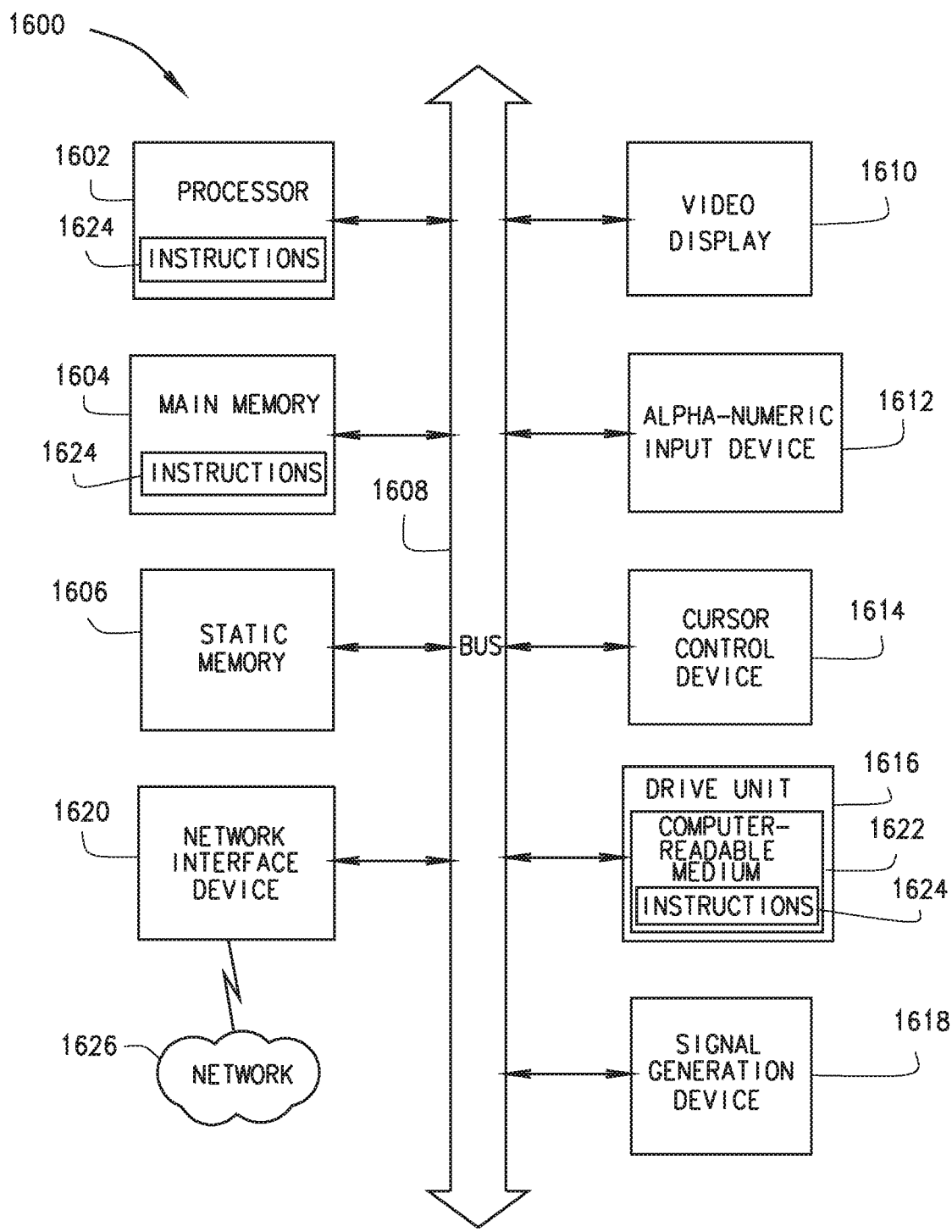
FIG. 16 is a block diagram of a machine in the example form of a computer system within which a set of instructions for causing the machine to perform any one or more of the methodologies discussed herein may be executed or stored.

FIG. 16 shows a block diagram of a machine in the example form of a computer system 1600 within which a set of instructions may be executed causing the machine to perform any one or more of the methods, processes, operations, or methodologies discussed herein. The devices 102, 106, 122-144 may include the functionality of the one or more computer systems 1600.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions sequential or otherwise) that specifies actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU) a graphics processing unit (GPU) or both), a main memory 1604 and a static memory 1606, which communicate with each other via a bus 1608. The computer system 1600 further includes a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a drive unit 1616, a signal generation device 1618 (e.g., a speaker) and a network interface device 1620.

The drive unit 1616 includes a computer-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting computer-readable media.

The software 1624 may further be transmitted or received over a network 1626 via the network interface device 1620.

While the computer-readable medium 1622 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The term "based on" or using, as used herein, reflects an open-ended term that can reflect others elements beyond those explicitly recited.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

In an example embodiment, a pharmaceutical order filling system includes an order processing device to receive a pharmaceutical order and a loading device communicatively coupled to the order processing device. The loading device includes a container drop assembly and a label assembly, wherein the container drop assembly includes a container drop rotary wheel and is configured to receive a container into a pocket of the container drop rotary wheel from a container drop tube that terminates above the container drop rotary wheel. The loading device also includes a container conveyor configured to pull the container from the pocket of the container drop rotary wheel when the pocket of the container drop rotary wheel rotates past an exit of the container drop assembly and to convey the container to the label assembly. The label assembly is configured to print a label containing information associated with the pharmaceutical order and place the label on the container.

In another example embodiment, a pharmaceutical order filling system includes an order processing device to receive a plurality of pharmaceutical orders and a loading device communicatively coupled to the order processing device. The loading device includes a container drop assembly and a label assembly and the container drop assembly includes a container drop rotary wheel and is configured to sequentially receive a plurality of containers from a container drop tube. The loading device also includes a container conveyor configured to sequentially transport the plurality of containers to the label assembly, wherein the label assembly is configured to sequentially print a plurality of labels, each label of the plurality of labels containing information associated with a unique one pharmaceutical order of the plurality of pharmaceutical orders, and to place each label of the plurality of labels on a unique one of the containers of the plurality of containers. The container conveyor is further configured to sequentially transport the plurality of containers labelled with the plurality of labels to a loading rotary wheel.

In another example embodiment, a pharmaceutical order filling system includes an order processing device to receive a plurality of pharmaceutical orders and a loading device communicatively coupled to the order processing device. The loading device includes a plurality of container drop assemblies, wherein each container drop assembly of the plurality of container drop assemblies is configured to receive a plurality of containers and is in communication with a unique one of a plurality of label assemblies, wherein each one of the plurality of label assemblies is configured to print and apply a unique label to each container of the plurality of containers received by the container drop assembly in communication with the one label assembly. The plurality of containers received by a first one of the plurality of container drop assemblies are a first size of container and the plurality of containers received by a second one of the plurality of container drop assemblies are a second size of containers. The loading device also includes a label print module for receiving a plurality of container identifiers, for determining whether each one of the plurality of container identifiers is associated with the first size of container or the second size of container, and for providing a unique set of container identifiers selected from the plurality of container identifiers to each of one of the plurality of label assemblies based on the determination of the size of container associated with each of the plurality of container identifiers.

The inventive subject matter may be represented in a variety of different embodiments of which there are many possible permutations.

Thus, methods and systems for labelling and loading containers onto a pallet have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The methods described herein do not have to be executed in the order described, or in any particular order. Moreover, various activities described with respect to the methods identified herein can be executed in serial or parallel fashion.

The invention claimed is:

1. An apparatus comprising:
a container drop assembly including a container drop rotary wheel configured to receive a container into a container drop pocket of the container drop rotary wheel from a container drop tube that terminates above the container drop rotary wheel, the container drop rotary wheel being rotatable to a plurality of positions including an exit position and a label position;
a container transport mechanism configured to pull the container from the container drop pocket of the container drop rotary wheel when the container drop pocket of the container drop rotary wheel rotates to the exit position of the container drop assembly and to transport the container to a label assembly, wherein the container transport mechanism transports the container to a loading rotary wheel, the loading rotary wheel being configured to receive the container from the container transport mechanism into a loading rotary wheel pocket of the loading rotary wheel, rotate the container retained within the loading rotary wheel pocket past a label reader configured to read a label on the container, and rotate the container retained within the loading rotary wheel pocket to a pick position after the label has been read by the label reader; and
wherein the label assembly is configured to label the container with a prescription label when the container drop rotary wheel is rotated to the label position.

2. The apparatus of claim 1, wherein the container transport mechanism further comprises a robot arm, the robot arm being configured to remove the container from the pick position to a designated position on a transportation structure.

3. The apparatus of claim 2, wherein the transportation structure is a substantially square pallet including twenty-five cavities in a five by five cavity row/column configuration.

4. The apparatus of claim 2, wherein the robot arm includes a rotatable arm that moves in a XY frame and is fixed in Z directions.

5. The apparatus of claim 1, wherein the prescription label includes drug dispensing information, patient information, and prescription information.

6. The apparatus of claim 1, wherein the label assembly labels the container by printing the prescription label and placing the prescription label on the container.

7. The apparatus of claim 1, further comprising:
a container drop motor configure to actuate the container drop rotary wheel.

8. The apparatus of claim 1, wherein the container drop pocket includes free wheels.

9. The apparatus of claim 1, further comprising:
a container drop sensor to determine whether the container is in the container drop pocket when the container drop rotary wheel is so positioned.

10. The apparatus of claim 1, wherein the container drop assembly includes a housing with a riser that holds the container drop assembly above the container transport mechanism.

11. The apparatus of claim 1, wherein the container transport mechanism includes a belt conveyor.

12. The apparatus of claim 1 further comprising:
a plurality of container drop tubes including the container drop tube, wherein at least a portion of the container drop tube is vertically fed and comprises at least one fixed end;
wherein the container exists the container drop rotary wheel horizontally; and
wherein the container further comprises an empty container.

13. The system of claim 12, wherein the label assembly is configured to print a prescription label and place the prescription label on the container when the container drop rotary wheel is rotated to a label position of the container drop rotary wheel.

14. The system of claim 13, wherein the container drop tube is adapted to receive a first sized container and an additional container drop tube among the plurality of container drop tubes is configured to receive a second sized container, the first sized container and the second sized container being of a different size.

15. An apparatus comprising:
a container drop assembly including a container drop rotary wheel configured to receive a container into a container drop pocket of the container drop rotary wheel from a container drop tube that terminates above the container drop rotary wheel, the container drop rotary wheel being rotatable to a plurality of positions including an exit position and a label position, and wherein the container drop assembly includes an additional drop pocket and a spacer in between the container drop pocket and the additional drop pocket;
a container transport mechanism configured to pull the container from the container drop pocket of the container drop rotary wheel when the container drop pocket of the container drop rotary wheel rotates to the exit position of the container drop assembly and to transport the container to a label assembly; and
the label assembly configured to label the container with a prescription label when the container drop rotary wheel is rotated to the label position.

16. A method comprising:
receiving, through an ordering device, a plurality of pharmaceutical orders;
sequentially receiving, through a container drop assembly, a plurality of containers from a container drop tube, the container drop assembly including a container drop rotary wheel;
sequentially transporting, through a container conveyor, the plurality of containers to a label assembly;
sequentially printing, via a label assembly, a plurality of labels in accordance with a printing sequence, each label of the plurality of labels containing information associated with a unique one pharmaceutical order of the plurality of pharmaceutical orders;
placing, via the label assembly, each label of the plurality of labels on a unique one of the containers of the plurality of containers;
sequentially transporting, via the container conveyor, the plurality of containers labelled with the plurality of labels to a loading rotary wheel; and
sequentially removing, via a robot arm, the plurality of containers labelled with the plurality of labels from the loading rotary wheel and placing the containers onto a pallet according to a predetermined loading sequence, wherein the printing sequence corresponds to the predetermined loading sequence.

17. The method of claim 16 wherein receiving each pharmaceutical order further comprises receiving at least one data set from a database wherein the data set is further used to complete the prescription.

18. The method of claim 17 wherein the data set further comprises at least one of order data, member data, claims data, drug data, prescription data, sponsor data, and combinations thereof.

19. The method of claim 17 wherein the order data further comprises at least one of: drug name, drug strength, quantity, prescription materials, container requirements, and order verification.

20. The method of claim 16 further comprising applying at least one routing decision for each of the plurality of pharmacy orders where each routing decision identifies at least one device in a pharmacy that is responsible for filling at least a portion of the pharmacy order.

21. The method of claim 16 further comprising applying at least one consolidation decision for each of the plurality of pharmacy orders where each consolidation decision determines what portions of one or more prescription orders should be shipped together.

22. The method of claim 16 further comprising verifying that each of the plurality of containers is labelled properly, wherein such verification is achieved by applying an inspection device configured to perform at least one of: scanning each label, imaging each label, and combinations thereof.

23. The method of claim 16 wherein transporting the plurality of containers to a label assembly further comprises moving the plurality of containers from the container drop assembly onto the container conveyer using a rotary wheel.

24. The method of claim 16 wherein transporting the plurality of containers further comprises placing each container onto a pallet.

25. The method of claim 16 further comprising:
reading a RFID tag on the pallet to obtain one or more container identifiers;
parsing each container identifier into a container size; and
transmitting parsed container identifiers to a label assembly associated with the identified container size.

26. The method of claim 25 further comprising:
writing at least one of a group status and a loading system identifier onto the RFID tag, wherein the writing is achieved by using a RFID reader;
reading, using the RFID reader, a route identifier from the RFID tag; and
releasing the pallet from the loading station after all labeled containers have been placed onto the pallet.

27. The method of claim 26 further comprising routing the pallet to an automated dispensing device based on the route identifier.

28. The method of claim 24 further wherein placing each container onto a pallet further comprises scanning each labelled container with a scanner and using the information obtained to place each container into a designed cavity in the pallet.

29. An apparatus comprising:
a container drop assembly including a container drop rotary wheel configured to receive an empty container into a container drop pocket of the container drop rotary wheel from a container drop tube of a plurality of container drop tubes,
wherein the container drop tube is adapted to receive a first sized container and an additional container drop tube among the plurality of container drop tubes is configured to receive a second sized container, the first sized container and the second sized container being of a different size, and
wherein at least a portion of each container drop tube is vertically fed and comprises at least one fixed end that terminates above the container drop rotary wheel, the container drop rotary wheel being rotatable to a plurality of positions including an exit position, in which a container exits the container drop rotary wheel horizontally, and a label position; and
a container transport mechanism configured to pull the container from the container drop pocket of the container drop rotary wheel when the container drop pocket of the container drop rotary wheel rotates to the exit position of the container drop assembly and to transport the container to a label assembly
wherein the label assembly is configured to label the container with a prescription label when the container drop rotary wheel is rotated to the label position.

* * * * *